(12) United States Patent
Nakamura et al.

(10) Patent No.: US 8,410,446 B2
(45) Date of Patent: Apr. 2, 2013

(54) FLUORESCENT MATERIAL, SCINTILLATOR USING SAME, AND RADIATION DETECTOR USING SAME

(75) Inventors: Ryouhei Nakamura, Tokorozawa (JP); Shunsuke Ueda, Ibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 698 days.

(21) Appl. No.: 12/525,477

(22) PCT Filed: Feb. 4, 2008

(86) PCT No.: PCT/JP2008/051734
§ 371 (c)(1),
(2), (4) Date: Mar. 5, 2010

(87) PCT Pub. No.: WO2008/093869
PCT Pub. Date: Aug. 7, 2008

(65) Prior Publication Data
US 2010/0187423 A1    Jul. 29, 2010

(30) Foreign Application Priority Data

Feb. 2, 2007  (JP) ................................. 2007-024647
Nov. 22, 2007  (JP) ................................. 2007-303228

(51) Int. Cl.
*G01T 1/20* (2006.01)
*G01J 1/58* (2006.01)

(52) U.S. Cl. .......... 250/361 R; 250/363.01; 250/363.02; 250/363.04; 250/458.1; 250/370.09; 250/370.11; 252/301.4 R; 252/301.4 F

(58) Field of Classification Search .............. 250/361 R, 250/370.11, 363.02, 363.04, 458.1, 370.09; 252/301.4 R, 301.4 F
See application file for complete search history.

(56) References Cited

U.S. PATENT DOCUMENTS

| 5,728,213 A | 3/1998 | Kurata et al. |
| 6,203,726 B1 | 3/2001 | Danielson et al. |
| 2003/0141484 A1 | 7/2003 | Yamada et al. |
| 2004/0021129 A1 | 2/2004 | Sumiya et al. |

FOREIGN PATENT DOCUMENTS

| CN | 1254747 A | 5/2000 |
| EP | 1 829 950 A1 | 9/2007 |
| JP | 9-142993 A | 6/1997 |
| JP | 2001-4753 A | 1/2001 |

(Continued)

OTHER PUBLICATIONS

Chinese Office Action mailed Mar. 26, 2012 with English Translation.

*Primary Examiner* — David Porta
*Assistant Examiner* — Yara Green
(74) *Attorney, Agent, or Firm* — Birch, Stewart, Kolasch & Birch, LLP

(57) ABSTRACT

A fluorescent material for a scintillator to be used in a radiation detector is provided. The fluorescent material is designed to have a high fluorescent intensity and a low level of afterglow a short term of 1 to 300 ms after the termination of X-ray radiation.

The above fluorescent material contains Ce as an activator. In addition, the material must contain at least Gd, Al, Ga, O, Fe, and a component M. The component M is at least one of Mg, Ti, and Ni. In addition, the composition of the material must be expressed by the general formula:

$$(Gd_{1-x-z}Lu_xCe_z)_{3+a}(Al_{1-u-s}Ga_uSc_s)_{5-a}O_{12}$$

wherein $0 \leq a \leq 0.15$, $0 \leq x \leq 0.5$, $0.0003 \leq z \leq 0.0167$, $0.2 \leq u \leq 0.6$, and $0 \leq s \leq 0.1$, and wherein, regarding the concentrations of Fe and M, Fe: $0.05 \leq$ Fe concentration (mass ppm) $\leq 1$, and $0 \leq$ M concentration (mass ppm) $\leq 50$.

18 Claims, 13 Drawing Sheets

FOREIGN PATENT DOCUMENTS

| | | |
|---|---|---|
| JP | 2001-183463 A | 7/2001 |
| JP | 2001-294853 A | 10/2001 |
| JP | 2001-303048 A | 10/2001 |
| JP | 2002-189080 A | 7/2002 |
| JP | 2003-119070 A | 4/2003 |
| JP | 2004-59384 A | 2/2004 |
| JP | 2007-246653 A | 9/2007 |
| JP | 2008-24739 A | 2/2008 |
| WO | WO-99/33934 A1 | 7/1999 |
| WO | 2006/068130 A1 | 6/2006 |

FLUORESCENT MATERIAL, SCINTILLATOR USING SAME, AND RADIATION DETECTOR USING SAME

TECHNICAL FIELD

The present invention relates to a fluorescent material configured to absorb radiation such as X-rays and emit fluorescence. The present invention also relates to a scintillator using such a fluorescent material. The present invention also relates to a radiation detector using such a fluorescent material.

BACKGROUND ART

One example of an X-ray diagnostic device is an X-ray CT (Computed Tomography) scanner. This CT scanner is composed of an X-ray tube and an X-ray detector. The tube is designed to emit a fan-shaped beam of X-rays, i.e., an X-ray fan beam. The detector is composed of many X-ray detecting elements arrayed side-by-side. The scanner operates as follows: The X-ray tube emits a series of X-ray fan beams one after another onto the X-ray detector. Each fan beam incident on the surface a tomographic layer is oriented at a predetermined angle, for example, 1 degree, from the previous one. The scanner collects thereby data on absorptions of X-rays. Subsequently, the data is analyzed by a computer. An absorptance at an individual location on the surface of a tomographic section is thereby calculated. An image is thereby formed according to the absorptances.

Conventionally, as this X-ray detector, a xenon gas detector has been used. This detector operates as follows: The detector has a gas chamber filled with a xenon gas. This detector has many electrodes arrayed therein. First, a voltage is applied between each pair of electrodes. Subsequently, the detector is irradiated by X-rays. The xenon gas is thereby ionized. A current signal is thereby output. The level of the signal corresponds to the intensity of the emission of X-rays. This enables an image to be formed. However, the interior pressure of the xenon gas filled chamber is high. Therefore, the window of the chamber must be thick. This decreases use efficiency of X-rays. In addition, in order to obtain a high resolution CT scanner, the thickness of an electrode plate must be very small. However, if the electrode plate is thin, vibration from the exterior vibrates the electrode plate. This generates noise. This constitutes a problem.

On the other hand, the following type of X-ray detector has been developed and has been put to practical use. The detector is composed of a specific type of scintillator and a silicon photodiode. The scintillator is made of a fluorescent material such as a $CdWO_4$ single crystal, a $(Y, Gd)_2O_3$:Eu, Pr ceramic, a, $Gd_2O_2S$:Pr, Ce, F ceramic (referred to as "GOS:Pr" hereinafter), or a polycrystalline ceramic made of an oxide (referred to as "GGAG:Ce" hereinafter) having a garnet structure primarily containing gadolinium oxide, gallium oxide, and aluminum oxide, and cerium oxide. In this X-ray detector, when absorbing X-rays, the scintillator emits fluorescent light. Subsequently, the silicon photodiode detects this light. Thus, X-rays are detected. The fluorescent material constituting the scintillator emits light having a wavelength corresponding to an energy level produced by an activator element added to the matrix thereof. If this wavelength is not smaller than 500 nm and corresponds to a visible light, this causes the silicon photodiode to acquire high detection efficiency. This in turn causes the X-ray detector to acquire particularly high sensitivity.

A compositional formula expressing a fluorescent material contains the colon ":". A matrix is indicated on the left side thereof. An activator ion is indicated on the right side thereof. If an X-ray detector is formed by using such materials, this makes it possible to miniaturize an X-ray detecting element, to increase the number of channels and to obtain a high resolution image. In general, such a fluorescent material is required to be a highly homogeneous material, to vary little from one piece thereof to another in the X-ray characteristics, to be little deteriorated by radiation, to keep the fluorescence characteristics substantially unchanged when environmental conditions such as temperature are changed, to be easy to machine, to be hardly deteriorated by machining, to absorb substantially no moisture, to be not deliquescent, to be chemically stable, etc.

In this type of X-ray detector, the more a scintillator absorbs X-rays, the higher the light intensity (referred to also as the "fluorescence intensity" hereinafter). The higher the light intensity becomes, the higher the sensitivity of the detector. Thus, the high intensity of fluorescence requires absorbing X-rays sufficiently. Given a constant amount of X-ray radiation, the less a scintillator absorbs X-rays, the more the scintillator transmits X-rays. This causes noise in a silicon photodiode. This in turn decreases the sensitivity. The amount of transmission of X-rays through a scintillator may be decreased by increasing the thickness of the scintillator. However, an increase in the thickness thereof hinders miniaturization of an X-ray detecting element. This increases the cost. Therefore, it is desirable that a fluorescent material be thin and have a large X-ray absorption coefficient. In addition, the lower the light transmittance in a fluorescent material, the less likely the emitted light reaches the silicon photodiode. This substantially decreases the fluorescence intensity. Therefore, in order to obtain high fluorescence intensity, a fluorescent material to be used as a scintillator is required (1) to have a large X-ray absorptance and (2) to have a high light transmittance for fluorescent light.

First, high resolution is required in X-ray computed tomography. High resolution may be achieved by miniaturizing an X-ray detecting element. Second, X-ray CT must avoid effects due to movements of the subject. This may be achieved by shortening scan time. All this causes an X-ray detecting element to have a shortened integration time. This in turn causes the total amount of absorbed X-rays within an integration time to be decreased. This makes high fluorescence efficiency (high fluorescence intensity) necessary. The time resolution of an X-ray detecting element may be increased in that the intensity of fluorescence (afterglow) after the termination of X-ray radiation decreases instantaneously and considerably. This requires a small time constant for the decay of fluorescence and a low level of afterglow. The fluorescence decay time constant refers to a time period in which the intensity of fluorescence after the termination of X-ray radiation has decayed to 1/e of the intensity of fluorescence during X-ray radiation. The level of afterglow is the ratio of the fluorescent intensity a predetermined time after the termination of X-ray radiation to the fluorescent intensity during X-ray radiation. If the decay occurred perfectly exponentially, a decrease in the decay time constant would necessarily cause a decrease in the level of afterglow. However, actually, the level of afterglow does not decrease exponentially. Therefore, a high-performance X-ray CT scanner with the low level of afterglow requires a fluorescent material that has a small decay time constant and a low level of afterglow. Table 1 shows the fluorescent intensity, the decay time constant, and the level of afterglow 30 ms after the termination of X-ray radiation for various types of fluorescent materials that have been conventionally used.

TABLE 1

| Composition | Material | Density | Fluorescence Intensity | Decay Time Constant (μs) | Afterglow (% at 30 ms) |
|---|---|---|---|---|---|
| $CdWO_4$ | Singlecrystal | 7.99 | 56 | 5.0 | 0.002 |
| $Gd_2O_2S$:Pr, Ce, F | Polycrystal | 7.28 | 100 | 3.0 | 0.01 |
| $(Y, Gd)_2O_3$:Eu, Pr | Polycrystal | 5.92 | 100 | 1000 | 0.01 |
| $Gd_3Ga_5O_{12}$:Cr, Ce | Polycrystal | 7.09 | 72 | 140 | 0.01 |
| $Gd_3Al_3Ga_2O_{12}$:Ce | Polycrystal | 6.46 | 95 | app. 0.1 | 0.01 |

Footnote 1: The fluorescence intensity, the decay time constant, the level of afterglow were measured using a silicon photodiode (S2281 manufactured by Hamamatsu Photonics)
Footnote 2: The fluorescence intensity is a relative value with reference to the fluorescence intensity of $Gd_2O_2S$:Pr, Ce, F.

Among the above materials, $Gd_3Al_3Ga_2O_{12}$:Ce (GGAG:Ce) emits fluorescent light. This occurs in that Ce acts as an activator Ce. That is, this is caused by the allowed transition of $Ce^{3+}$ from 5d level to 4f level. Therefore, Patent Documents 1 to 7 disclose a polycrystalline material made of GGAG:Ce as a fluorescent material.

Patent Document 1: Japanese Patent Publication No. 2001-4753
Patent Document 2: Japanese Patent Publication No. 2003-119070
Patent Document 3: Japanese Patent No. 3938470
Patent Document 4: Japanese Patent Publication No. 2002-189080
Patent Document 5: Japanese Patent Publication No. 2001-303048
Patent Document 6: Japanese Patent Publication No. 2001-294853
Patent Document 7: Japanese Patent Publication No. 2001-183463

DISCLOSURE OF THE INVENTION

Problems to be Solved by the Invention

Recently, newer high-performance X-ray CT scanners usually have shorter scan times. The reason for this is to avoid effects due to movements of the subject, to obtain an image having a high-resolution tomographic layer, and to minimize the amount of exposure dose. Therefore, regarding a scintillator for an X-ray detecting element, it has been proposed that, in addition to the level of afterglow 30 to 300 ms after the termination of X-ray radiation (long term afterglow), the level of afterglow 1 to 10 ms after the termination of X-ray radiation (short term afterglow) be substantially increased. The above GGAG:Ce polycrystalline material has a fluorescence decay time constant of approximately 100 ns. This is a very small value. This is due to use of fluorescence caused by $Ce^{3+}$. However, this material has a problem of a comparatively high level of short term afterglow. The present invention has been conceived in view of this problem.

The object of the present invention is to solve the above problems.

Means for Solving the Problems

According to the present invention, the above problems are solved by a fluorescent material comprising:
Ce, the Ce acting as an activator;
at least Gd, Al, Ga, O, Fe, and a component M;
wherein the component M is at least one of Mg, Ti, Ni;
wherein the composition of the material is expressed by the general formula:

$(Gd_{1-x-z}Lu_xCe_z)_{3+a}(Al_{1-u-s}Ga_uSc_s)_{5-a}O_{12}$ wherein
0≦a≦0.15,
0≦x≦0.5,
0.0003≦z≦0.0167,
0.2≦u≦0.6, and
0≦s≦0.1; and
wherein, regarding the concentrations of Fe and the component M,
0.05≦Fe concentration (mass ppm)≦1, and
0≦M concentration (mass ppm)≦50.

In the fluorescent material according to the present invention, the value a is preferably 0.005≦a≦0.05.

In the fluorescent material according to the present invention, the value x is preferably 0.03≦x≦0.2.

In the fluorescent material according to the present invention, the value z is preferably 0.001≦z≦0.005.

In the fluorescent material according to the present invention, the value u is preferably 0.35≦u≦0.55.

In the fluorescent material according to the present invention, the value s is preferably 0.01≦s≦0.1.

In the fluorescent material according to the present invention, the concentration of the Fe is preferably, 0.05≦Fe concentration (mass ppm)≦0.4.

In the fluorescent material according to the present invention, the concentration of the component M is, 3≦M concentration (mass ppm)≦15.

The present invention also relates to a fluorescent material for a scintillator having a garnet structure, the material comprising:
Ce, Gd, Ga, Al, O, Fe, and a component M;
wherein Ce acts as an activator;
wherein:
24.3≦Gd concentration (mass %)≦57.6,
0≦Lu concentration (mass %)≦31.1,
0.02≦Ce concentration (mass %)≦0.7,
4.0≦Al concentration (mass %)≦12.8,
7.5≦Ga concentration (mass %)≦22.6,
0≦Sc concentration (mass %)≦2.64,
19.6≦O concentration (mass %)≦22.8,
0.05≦Fe concentration (mass ppm)≦1, and
0≦M concentration (mass ppm)≦50;
wherein the component M is at least one of Mg, Ti, and Ni; and
wherein the sum of all the elements is set at 100 mass %.

The present invention also relates to a fluorescent material for a scintillator having a garnet structure, the material comprising:
Ce, Gd, Ga, Al, O, Fe, and a component M;
wherein Ce acts as an activator,
wherein:
45.9≦Gd concentration (mass %)≦52.8,
1.7≦Lu concentration (mass %)≦12.0,
0.06≦Ce concentration (mass %)≦0.24, 7.0≦Al concentration (mass %)≦10.0,
13.7≦Ga concentration (mass %)≦20.6,
0.05≦Sc concentration (mass %)≦0.5,
20.7≦O concentration (mass %)≦21.9,
0.05≦Fe concentration (mass ppm)≦0.4, and
3≦M concentration (mass ppm)≦15;
wherein the component M is at least one of Mg, Ti, and Ni, and
wherein the sum of all the elements is set at 100 mass %.

The present invention also relates to a fluorescent material comprising:
Ce, the Ce acting as an activator;
at least Gd, Al, Ga, O, Fe, and a component Lu and/or Y;
wherein the fluorescent material contains not more than 3% of Fe by weight of the content of Ce in a fluorescent material having a garnet structure expressed by the general formula:

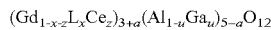

$(Gd_{1-x-z}L_xCe_z)_{3+a}(Al_{1-u}Ga_u)_{5-a}O_{12}$ wherein
L is Lu and/or Y,
0<a≦0.15,
0<x<1.0,
0.0003≦z≦0.0167, (x+z<1.0), and
0.2≦u≦0.6.

According to an aspect of the present invention, regarding a fluorescence spectrum obtained when the fluorescent material is excited by a excitation light having a wavelength of 260 nm, the ratio of the maximum fluorescence intensity in the wavelength range of 700 to 850 nm to the maximum fluorescence intensity in the wavelength range of 500 to 600 nm is not greater than 8%.

According to another aspect of the present invention, regarding the fluorescence spectrum, the ratio of the maximum fluorescence intensity in the wavelength range of 300 to 450 nm to the maximum fluorescence intensity in the wavelength range of 500 to 600 nm is not greater than 7%.

According to yet another aspect of the present invention, the fluorescent material is polycrystalline.

According to yet another aspect of the present invention, a scintillator is made of the fluorescent material.

According to yet another aspect of the present invention, the scintillator has a thickness of 0.5 to 5 mm.

According to yet another aspect of the present invention, a radiation detector comprises:
the scintillator; and
a light receiving element, the element designed to detect fluorescent light emitted from the scintillator.

ADVANTAGEOUS EFFECT OF THE INVENTION

A fluorescent material according to the present invention is able to provide a scintillator having a low level of afterglow 1 to 10 ms after the termination of X-ray radiation, as compared with a conventional fluorescent material of GGAG:Ce. A radiation detector according to the present invention, formed using such a fluorescent material as a scintillator, has a shorter scan time. The detector may contribute thereby to increased resolution. The detector may also have stable detection performance.

BEST MODE FOR CARRYING OUT THE PRESENT INVENTION

The inventor studied in detail the causes of the above problem. It was thereby found that when a fluorescent material of GGAG:Ce was excited by a predetermined light, thereby producing an afterglow spectrum, the long wavelength component of 750 to 850 nm therein was correlated with the short term afterglow of the fluorescent material. This enabled the inventor to achieve the present invention.

The afterglow from X-ray excitation is proportional to the afterglow from ultraviolet ray excitation. In view of this, a study was conducted to find out why the level of afterglow increases by use of a fluorescence spectrophotometer (F4500 manufactured by Hitachi Co. Ltd.).

FIG. 1 is directed to the case in which a GGAG:Ce single crystal grown using a CZ method is excited using an ultraviolet light at a wavelength of 260 nm as an excitation light. FIG. 1 is a schematic diagram of a fluorescent spectrum in this case. The GGAG:Ce single crystal contains an ion $Ce^{3+}$. This ion $Ce^{3+}$ exhibits a smoothly curved fluorescent spectrum. The spectrum peaks at a wavelength of 540 nm. The fluorescence around a wavelength of 315 nm and the fluorescence around a wavelength of 400 nm are thought to be due to defects in the lattice. On the other hand, a weak, broad fluorescence is observed in the range of wavelengths of 700 to 850 nm.

FIG. 2 is a schematic diagram of afterglow profiles for each wavelength in this fluorescent material. That is, FIG. 2 shows change in the fluorescence intensity after stopping emitting excitation light. As can be seen from the figure, the fluorescence at the wavelength of 315 nm causes a very low level of afterglow. Similarly, the fluorescence at the wavelengths of 400 nm causes a very low level of afterglow. However, the fluorescence at the wavelength of 800 nm causes a very high level of afterglow.

FIG. 3 is directed to the case in which a sample of a GGAG:Ce polycrystal sintered by using an HIP sintering method is excited using an ultraviolet light at a wavelength of 260 nm as a excitation light. FIG. 3 is a schematic diagram of a fluorescent spectrum in this case. The GGAG:Ce material contains an ion $Ce^{3+}$. This ion $Ce^{3+}$ exhibits a smoothly curved fluorescent spectrum. The spectrum peaks at a wavelength of 540 nm. The fluorescence around a wavelength of 380 nm is thought to result from an overlap of the fluorescence due to defects in the lattice and the fluorescence caused by $Ce^{3+}$ incorporated in a perovskite phase constituting a heterogeneous phase in the GGAG:Ce polycrystal. When a perovskite phase is detected using an X-ray diffraction method, the fluorescence at this wavelength of 380 nm appears strongly. However, even when a perovskite phase is not detected at all, this fluorescence appears. On the other hand, a weak, broad fluorescence is observed in the range of wavelengths of 700 to 850 nm.

FIG. 4 is a schematic diagram of afterglow profiles for each wavelength in this fluorescent material. As can be seen from the figure, the fluorescence at the wavelength of 380 nm causes a very low level of afterglow. However, the fluorescence at the wavelength of 800 nm causes a very high level of afterglow. This also can be seen from the figure.

In a polycrystalline fluorescent material, the fluorescence at the wavelength of 380 nm is due to the fluorescence of $Ce^{3+}$ in a crystalline structure that differs from a garnet structure. This fluorescence may be measured also in the case of a slight fluctuation of a crystalline structure, the level of the fluctuation being unable to be evaluated using an X-ray diffraction method. The level of this fluorescence may be considerably decreased in that, after mixing by a ball mill and then calcining, a mixture powder of raw materials has a particle size appropriately controlled so as to make the powder more homogeneous. This makes it possible to prevent the mixture from becoming heterogeneous due to the differences in sedimentation velocities while the mixture is being dried after being mixed. In view of this, it is desirable that, after a high-density raw material made of $Gd_2O_3$ and a high-density raw material made of $Lu_2O_3$ are mixed using a ball mill, the resulting mixture powder have an average particle size of 0.02 to 3 μm, that, after a low-density material made of $Al_2O_3$ and a low-density material made of $Ga_2O_3$ are mixed using a ball mill, the resulting mixture powder have an average particle size of 0.3 to 6 μm, and that, regarding the two average particle size, the ratio of the former to the latter rage from 1 to 6. Therefore, if, for example, a ball to be used for a ball mill, is made of a resin material so that, during the step of mixing at least two types of powder each made of a raw material, these raw materials are hardly pulverized, the raw materials that have an average particle size that is within the above range may be used. On the other hand, if a ball made of, for example, alumina, is to be used for a ball mill, the mixture power made of raw materials are pulverized by the ball mill. Therefore, in order to obtain an average particle size that is within the above range after milling by the ball mill, a particle size of each of the raw materials and the conditions under which the raw materials are to be mixed may be appropriately determined.

In view of the above, the inventors studied the essential causes of the fluorescence at the wavelengths of 700 to 850 nm. The cause of the fluorescence at this range of wavelengths was thereby found to be the fluorescence of a trace of Fe incorporated in a garnet crystal. FIG. 5 is a schematic diagram of a fluorescent spectrum of a sample prepared by intentionally adding iron (II) nitrate to a material similar to that in FIG. 3 when synthesizing a material. It was found that the fluorescence intensity at the wavelengths of 700 to 850 nm increases with increasing additive rate of Fe.

FIG. 6 is a schematic diagram showing the results of measuring the afterglow profiles at a wavelength of 800 nm of a sample containing 1.3 mass ppm of Fe and of a sample containing 0.7 mass ppm of Fe. As can be seen from the figure, the fluorescence component caused by Fe almost disappears after the elapse of 20 ms. However, as can also be seen from the figure, Fe greatly affects the level of afterglow after the elapse of 3 ms. In comparison with a sample containing 1.3 mass ppm of Fe, a sample containing 1.0 mass ppm of Fe is such that the fluorescence intensity of afterglow is decreased approximately to a half. Furthermore, in comparison with a sample containing 0.85 mass ppm of Fe, a sample containing 0.05 to 0.7 mass ppm of Fe is such that change in the fluorescence intensity in each of the case of the fluorescence intensity after the elapse of 1 ms and the case of the fluorescence intensity after the elapse of 5 ms is decreased. When the rate of change in the fluorescence intensity is small, afterglow affects signals in decreased measure. This makes it possible to further shorten the scan time of a radiation detector, thereby resulting in increased image resolution in a CT. If the content of Fe is made to have a range of 0.05 to 0.4 (preferable 0.35 instead of 0.4) mass ppm, this may sufficiently suppress the afterglow intensity. This is more preferable. The following equation holds:

Rate of Change in Fluorescence Intensity=Absolute Value of {(Fluorescence Intensity after 1 ms−Fluorescence Intensity after 5 ms)/Fluorescence Intensity after 1 ms×100 (%)}

Specifically, the following great differences occur.

1.0 mass ppm: Rate of Change in Fluorescence Intensity=44.4%

0.7 mass ppm: Rate of Change in Fluorescence Intensity=4.6%

0.05 mass ppm: Rate of Change in Fluorescence Intensity=7.0%

FIG. 7 is a schematic diagram of the relationship between the content of Fe and the level of a 3 ms afterglow. The content of Fe is proportional to the level of a 3 ms afterglow. It was found out that the level of 3 ms afterglow increased with an increase in the content of Fe. All the above results enabled the present invention to be accomplished. The present invention is, in particular, able to control the level of afterglow in the above fluorescent material of GGAG:Ce. The present invention will be described below in detail based on the preferred embodiments with reference to the accompanying drawings.

First Embodiment

A fluorescent material according to the first embodiment of the present invention comprises Ce as an activator and further comprises at least Gd, Al, Ga, O, Fe, and a component M, wherein the component M is at least one of Mg, Ti, Ni. The composition of the fluorescent material is expressed by the general formula:

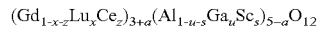

wherein
$0 \leq a \leq 0.15$,
$0 \leq x \leq 0.5$,
$0.0003 \leq z \leq 0.0167$,
$0.2 \leq u \leq 0.6$, and
$0 \leq s \leq 0.1$,
and wherein, regarding the concentrations of Fe and the component M,
$0.05 \leq$ Fe concentration (mass ppm) $\leq 1$, and
$0 \leq$ M concentration (mass ppm) $\leq 50$.

This material according to the present invention must contain Fe. The content of Si ranges from 0.05 to 1 mass ppm. FIG. 7 shows that when the content of Fe exceeds 1 mass ppm, this causes the 3 ms afterglow to exceed 800 ppm. Therefore, the after glow exceeds the tolerance level. This causes the upper limit of the content of Fe to be set at 1 mass ppm. However, the upper limit is preferably 1.0 mass ppm. In addition, first, the raw materials to be used to synthesize a fluorescent material each contain several to several of tens of mass ppm of Fe. Therefore, a fluorescent material synthesized by use of such raw materials inevitably contains several to several of tens of mass ppm of Fe. The content of Fe in a raw material may be decreased by heat treating the raw material under a vacuum to remove Fe. However, if the content of Fe in a raw material is to be decreased to smaller than 0.05 mass ppm, a high temperature vacuum heat treatment is necessary. This agglomerates the raw material firmly. This makes pulverizing necessary. However, pulverizing inevitably causes Fe to enter into the raw material. This causes the lower limit to be set at 0.05 mass ppm.

A chemical formula of a garnet structure containing Ce, which acts as an activator, gadolinium (Gd), gallium (Ga), aluminum (Al), oxygen (O), and silicon (Si) is $(Gd, Ce)_3 (Al, Ga)_5 O_{12}$. A garnet crystal structure contains three sites: C site (dodecahedral site); A site (octahedral site), and D site (tetrahedral site). The C site contains almost all of the rare earth ions. The A site contains substantially the rest thereof. The A site and the D site each contain both Al and Ga. The C site substantially does not contain both Al and Ga. One cause of the production of an afterglow is that, in addition to the type of energy level formed by $Ce^{3+}$ that, by the nature thereof, is able to emit light, a different type of an energy level permitting an electron transition is formed in a forbidden band. Thus, an electron transition via the latter type of a level may occur. This causes an afterglow. When a hole occurs in a C site (dodecahedral site), this causes the latter type of an energy level to be formed. However, this may be suppressed by making $0 \leq a$. This in turn makes it possible to obtain higher fluorescence intensity while decreasing the level of afterglow. On the other hand, when the value a increases, this disadvantageously results easily in the production of $GdAlO_3$, etc., i.e., this disadvantageously results easily in the production of a perovskite phase (heterogeneous phase). This phase is distinct from a garnet structure. The index of refraction of a perovskite phase differs from that of a garnet phase constituted by the matrix. This scatters light at the perovskite phase. This decreases light transmittance for light having a fluorescence wavelength. This in turn decreases the fluorescence intensity of this fluorescent material.

FIG. 8 is directed to the case in which $x=0.1$, $z=0.0026$, and $u=0.41$. FIG. 8 is a schematic diagram showing the dependence of the fluorescence intensity and of the 300 ms afterglow on the value a. In this case, the relative fluorescence intensity is the fluorescence intensity when the maximum is defined as 100%. The maximum is the intensity when $a=0$. A "w" ms afterglow is the fluorescence intensity "w" milliseconds after the termination of X-ray radiation. The "w" is, for example, 3, 10, 30, or 300. The afterglow intensity of a "w" ms afterglow expresses the ratio of the fluorescence intensity during the emission of X-rays to the fluorescence intensity "w" milliseconds after the termination of X-ray radiation. The unit thereof is ppm (parts per million). When $a=0$, the fluorescence intensity is high. However, the level of afterglow is also high. When $a>0$, due to the above reason, the level of afterglow decreases rapidly. On the other hand, the fluorescence intensity decreases gradually with an increase in the value a. Thus, when $a=0.15$, the relative fluorescence intensity is 80% of the intensity when $a=0$. When the value a exceeds 0.15, this results in the production of a perovskite phase. The relative fluorescence intensity decreases thereby further. Therefore, when the lower limit of the relative fluorescence intensity is set at 80%, the upper limit of the value a must be set at 0.15 in order to obtain a fluorescent material having a low level of afterglow and a high fluorescence intensity. When the value a exceeds 0.15, this causes the relative fluorescence intensity to become smaller than 80%, though the level of afterglow is low. In order to obtain a particularly high fluorescence intensity and a low intensity of afterglow, the value a is preferably set at 0.005 to 0.05. This follows from FIG. 8.

If the C site (dodecahedral site) includes Lu, this makes it possible to make the average ionic radius of the C site (dodecahedral site) small. This in turn makes it possible to make the lattice constant small. This causes Al having a small ionic radius to reside stably in the A site (octahedral site). This makes it possible to suppress precipitation of a heterogeneous phase. The atom Lu has a large atomic weight. This makes it possible to increase the density of this fluorescent material. In addition, this makes it possible to increase an absorption coefficient of X-rays. FIG. 9 is directed to the case in which $a=0.10$, $z=0.0026$, and $u=0.41$. FIG. 9 is a schematic diagram showing the dependence of a relative fluorescence intensity on the value x. In this case, the relative fluorescence intensity is the fluorescence intensity when the maximum is defined as 100%. The maximum is the fluorescence intensity when $x=0.10$. FIG. 9 shows that the fluorescence intensity decreases with an increase in the value x. In this process, increasing the value x means substituting Lu for Gd. When substituting Lu for Gd, this decreases the lattice constant. This results in an increase in the width of the forbidden band. This shifts the fluorescence wavelength toward the side having shorter wavelengths. In general, a photodetector in an X-ray computed tomography is implemented by a silicon photodiode. A silicon photodiode has high spectral sensitivity on the side having longer wavelengths up to 800 to 900 nm. Therefore, when the amount of Lu substitutions increases, this decreases the fluorescence intensity in a region in which a silicon photodiode has high sensitivity. Therefore, if the lower limit of the relative fluorescence intensity is set at 80%, then $x \leq 0.5$ is set. Therefore, in order to obtain particularly high fluorescence intensity, and at the same time, in order to avoid producing a heterogeneous phase, x is preferably 0.03 to 0.2 in view of FIG. 9.

The value z determines the composition of Ce. The element Ce is a fluorescent activator. As shown in FIG. 10, when $0.0003 \leq z \leq 0.0167$, this causes the fluorescence intensity to become particularly high. In this case, the relative fluorescence intensity is the fluorescence intensity when the maximum is defined as 100%. The maximum is the fluorescence intensity when $z=0.003$. When z is smaller than 0.003, the number of Ce atoms to act as fluorescent activators is too small. This inhibits absorbed X-ray energy from being efficiently converted into light energy. When z is greater than 0.0167, this causes the Ce—Ce interatomic distance to become too small. This generates energy migration (so-called concentration quenching). This results in a decrease in fluorescence intensity. In order to obtain particularly high fluorescence intensity, the value z preferably ranges from 0.001 to 0.005. This can be seen from FIG. 10.

The value u determines the compositional ratio between Al and Ga. As shown in FIG. 11, when $0.2 \leq u \leq 0.6$, this increases the fluorescence intensity. In this case, the relative fluorescence intensity is the fluorescence intensity when the maximum (the fluorescence intensity when $u=0.5$ in this case) is defined as 100%. In particular, the fluorescence intensity peaks at $u=0.4$. When the value u is smaller than 0.2, this produces a perovskite phase. As described above, this phase decreases the fluorescence intensity. When the value u is greater than 0.6, this decreases the fluorescence intensity. This in turn increases the level of afterglow. In order to obtain particularly high relative fluorescence intensity (not smaller than 95%), the value u preferably ranges from 0.35 to 0.55. This can be seen from FIG. 11.

The element Sc occupies the entirety of the A site (octahedral site). This is an additive element acting to increase the fluorescence intensity and to decrease the level of afterglow. In this case, Ga ion has charge of +3. However, the ion with charge of +3 is easily to become monovalent. When Ga ion is charged with +1 (the ionic radius of $Ga^{+1}$ is greater than that of $Ga^{+3}$), this Ga ion has effective charge of −2. This decreases the fluorescence intensity and increases the level of afterglow. The ionic radius of $Sc^{3+}$ is greater than the ionic radius of $Al^{3+}$ and the ionic radius of $Ga^{3+}$. Therefore, Sc is thought to occupy the entirety of the A site so as to suppress change in the valence of $Ga^{3+}$.

FIG. 12 is directed to the case in which $a=0.12$, $x=0.096$, $z=0.0026$, $u=0.41$. FIG. 12 is a schematic diagram showing the dependence of the relative fluorescence intensity and the level of a 300 ms afterglow on the value s (Sc composition). In this case, the relative fluorescence intensity is the light intensity when $s=0$ is defined as 100%. Addition of a trace of Sc considerably decreases the level of afterglow. The level of afterglow does not change when the value s is not smaller than 0.03. On the other hand, the fluorescence intensity peaks at $s=0.05$. When the value s further increases, this decreases the fluorescence intensity. Therefore, $s \leq 0.7$ is set. In order to obtain high fluorescence intensity and a low level of afterglow, the value s preferably ranges from 0.01 to 0.1. This can bee seen from the plotted curves of points shown in FIG. 12.

Similarly, elements acting to decrease the level of afterglow, Mg, Ni, Ti are effective. Mg and Ni each are divalent. Ti is tetravalent. The optimal content of such elements is 0 to 50 mass ppm.

This fluorescent material according to the present invention has the following essential feature: The A site thereof or the D site thereof contains Fe. Element Fe emits infrared light in a garnet crystal structure containing Gd, Al, Ga, and O. The lifetime of the emission is approximately 20 ms (FIG. 6). Therefore, the content of Fe is critical for decreasing the level of a short term afterglow at 1 to 10 ms. A raw material such as $Gd_2O_3$, $Al_2O_3$, and $Ga_2O_3$ contains Fe. In particular, $Al_2O_3$ contains as much as several to several tens of mass ppm of Fe. The content of Fe in a raw material may be controlled by heat treating the raw material under a vacuum. The content of Fe may be decreased by increasing the temperature of the heat treatment or the duration thereof. However, such an increase tends to agglomerate the raw material firmly. This makes a pulverizing process necessary. However, such a pulverizing process inevitably causes Fe to enter into the material. Therefore, the content of Fe has 0.5 mass ppm as a lower limit. The level of a 3 ms afterglow increases with an increase in t. If t is not greater than $2\times10^{-5}$, the level of a 3 ms afterglow may be limited to a value that is not greater than 800 ppm. This is preferable for a scintillator to be used in a high-speed X-ray CT (Computed Tomography) scanner.

Regarding the above rage of the value x, $0.03 \leq x \leq 0.2$ is preferable to obtain particularly high fluorescent intensity. When synthesizing a material, this inevitably generates a trap level. Thus, it would be preferable for the action of such a trap level to be suppressed by setting the atomic ratio of Ce at $0.001 \leq z$. Element Ce in a matrix mostly takes the form of $Ce^{3+}$ ions. However, $Ce^{3+}$ is easily positively charged to become $Ce^{4+}$. Therefore, $Ce^{3+}$ acts as a hole trap quicker than a trap level within the forbidden. This causes light emission. This in turn decreases the level of afterglow. Regarding the above range of the value z, the value z is preferable set at $0.001 \leq 0.005$. This considerably increases fluorescence intensity.

Regarding the above range of the value u, the value u is preferably set at $0.35 \leq u \leq 0.55$. This considerably increases fluorescence intensity. This also decreases the level of afterglow. Regarding the above range of the value s, the value s is preferably set at $0.01 \leq s \leq 0.1$. This considerably increases fluorescence intensity. This also decreases the level of afterglow. The upper limit of the content of Fe is preferably set at 0.4 mass ppm. This limits the level of a 3 ms afterglow to a value that is not greater than 300 ppm.

As an element M acting to decrease the level of afterglow, Mg, Ni, Ti are effective. Mg and Ni each are divalent. Ti is tetravalent. However, the fluorescence intensity decreases with an increase in the content of M. Therefore, the content of M preferably ranges from 3 to 15 mass ppm.

FIGS. 13 to 15 are directed to M=Mg, M=Ti, and M=Ni, respectively. FIGS. 13 to 15 directed to the case in which a=0.03, x=0.1, z=0.0026, u=0.41, and s=0.01. These figures are a schematic diagram showing the dependence of the relative fluorescence intensity and of a 300 ms afterglow on the content of M. In this case, the relative fluorescence intensity is the fluorescence intensity when M=0 is defined as 100%. Addition of a trace of M considerably decreases the level of afterglow. On the other hand, the relative fluorescence intensity rapidly decreases with increasing M. In order to obtain high fluorescence intensity, M should be not greater than 50 mass ppm. More preferably, M is not greater than 15 mass ppm. In order to obtain a low level of afterglow, the lower limit of M should be set at 3 mass ppm. All this can bee seen from FIGS. 13 to 15.

As described above, the composition of a fluorescent material having a garnet structure is expressed by a formula of $(Gd_{1-x-z}Lu_xCe_z)_{3+a}(Al_{1-u-s}Ga_uSc_s)_{5-a}O_{12}$. Instead of this formula, the composition of the material may be expressed by the content (mass %) of each element. Then, the ranges are as follows:

$24.3 \leq$ Gd concentration (mass %) $\leq 57.6$,
$0 \leq$ Lu concentration (mass %) $\leq 31.1$,
$0.02 \leq$ Ce concentration (mass %) $\leq 0.7$,
$4.0 \leq$ Al concentration (mass %) $\leq 12.8$,
$7.5 \leq$ Ga concentration (mass %) $\leq 22.6$,
$0 \leq$ Sc concentration (mass %) $\leq 2.64$,
$19.6 \leq$ O concentration (mass %) $\leq 22.8$,
$0.05 \leq$ Fe concentration (mass ppm) $\leq 1$, and
$0 \leq$ M concentration (mass ppm) $\leq 50$;

The element M is at least one of Mg, Ti, and Ni. The sum of the contents of these elements is set at 100 mass %.

In the above composition, the more preferable ranges are as follows:

$45.9 \leq$ Gd concentration (mass %) $\leq 52.8$,
$1.7 \leq$ Lu concentration (mass %) $\leq 12.0$,
$0.06 \leq$ Ce concentration (mass %) $\leq 0.24$,
$7.0 \leq$ Al concentration (mass %) $\leq 10.0$,
$13.7 \leq$ Ga concentration (mass %) $\leq 20.6$,
$0.05 \leq$ Sc concentration (mass %) $\leq 0.5$,
$20.7 \leq$ O concentration (mass %) $\leq 21.9$,
$0.05 \leq$ Fe concentration (mass ppm) $\leq 0.4$, and
$3 \leq$ M concentration (mass ppm) $\leq 15$;

Second Embodiment

A fluorescent material according to the second embodiment of the present invention contains Ce as a fluorescent activator. In addition, the material contains at least Gd, Al, Ga, and O. In addition, the material contains Lu and/or Y. The composition of the material is expressed by the following general formula.

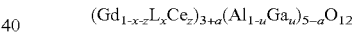

$$(Gd_{1-x-z}L_xCe_z)_{3+a}(Al_{1-u}Ga_u)_{5-a}O_{12}$$

wherein
L is Lu or Y,
$0 < a \leq 0.15$,
$0 < x < 1.0$,
$0.0003 \leq z \leq 0.0167$, (wherein x+z<1.0), and
$0.2 \leq u \leq 0.6$.

In addition, this fluorescent material has Fe added thereto. The weight ratio of Fe to Ce is not greater than 3%.

It is essential for this fluorescent material to contain Lu and/or Y. It is also essential for the composition of the material in a garnet structure to be deviated from the stoichiometric composition (a=0) so that 0<a. This means increasing excessively the amount of elements Gd, L, Ce in the C site (dodecahedral site) excessive, and decreasing accordingly the amount of elements Al and Ga in the A site (octahedral site) in the D site (tetrahedral site). This fluorescent material may be single crystal or polycrystal.

One cause of the production of an afterglow is that, in addition to the type of energy level formed by $Cc^{3+}$ that, by the nature thereof, is able to emit light, a different type of energy level permitting an electron transition is formed in a forbidden band. Thus, an electron transition via the latter type of a level may occur. Therefore, this may be suppressed by setting 0<a, thereby producing high fluorescence intensity and, at the same time, decreasing the level of afterglow. On the other hand, when the value a increases, this disadvantageously results easily in the production of $GdAlO_3$, etc., i.e., this disadvantageously results easily in the production of a perovskite phase (heterogeneous phase). This phase is distinct from a garnet structure. The index of refraction of a perovskite phase differs from that of a garnet phase constituted by the matrix. Light is thereby scattered in the perovskite phase. This decreases light transmittance for light having a fluorescence wavelength. This in turn decreases the fluorescence intensity of this fluorescent material.

The coefficient of thermal expansion of the perovskite phase and that of the garnet phase, which constitutes the matrix, are different. Therefore, when a perovskite phase is produced, this disadvantageously results easily in the production of cracks. As can be seen from FIG. 8, if a=0, this admittedly results in high fluorescence intensity, but also in the high level of afterglow. If a>0, due to the reason above, this drastically decreases the level of afterglow. On the other hand, the fluorescence intensity gradually decreases with the increasing value a. Thus, when a=0.15, the relative fluorescence intensity is 80% of the relative fluorescence intensity in the case of a=0. When the value a is greater than 0.15, this produces a perovskite phase. This in turn further decreases the relative fluorescence intensity. This disadvantageously results easily in the production of cracks. Therefore, when the lower limit of the relative fluorescence intensity is set at 80%, this causes the upper limit of the value a, that produces a fluorescent material having a low level of afterglow and having high fluorescence intensity, is set at 0.15. When the value a is greater than this, this admittedly produces the low level of afterglow. However, this causes the relative fluorescence intensity to become smaller than 80%. In addition, this disadvantageously results easily in the production of cracks.

The reason why $0.0003 \leq z \leq 0.0167$, is the same as that in the first embodiment. The reason why $0.2 \leq u \leq 0.6$, is the same as that in the first embodiment.

However, in this embodiment, x is set at 0<x<1.0, (where x+z<1.0). The fluorescent material according to this embodiment necessarily contains Lu and/or Y as L. Addition of these elements decreases the average ionic radius of the C site (dodecahedral site) in a garnet structure. This in turn decreases the lattice constant small. This enables Al having a small ionic radius to reside stably in the A site (octahedral site). This suppresses the production of a perovskite phase when a, u, and z are in the above ranges, respectively.

As described above, the upper limit of the value a is 0.15. The lower limit thereof is more preferably 0.032. When the value a is not greater than 0.032, this disadvantageously results easily in the production of cracks in the fluorescent material. This decreases manufacturing yield. Element Al in the A site (octahedral site) has a small ionic radius. This increases the lattice strain. When the atomic ratio of the C site (dodecahedral site) is set at greater than 3, this causes an excessive amount of rare earth ions to enter into the A site (octahedral site). This in turn increases the average ionic radius of the A site (octahedral site). This relaxes the lattice strain. However, when the value a is not greater than 0.032, such an effect is not sufficiently produced. This disadvantageously results easily in the production of cracks due to the lattice strain. FIG. 16 is directed to the case in which L is Lu, x=0.10, z=0.0027, and u=0.41. FIG. 16 is a schematic diagram showing the dependence of the relative fluorescence intensity and the manufacturing yield regarding the single crystal growth on the value a. In this case, the relative fluorescence intensity is the fluorescence intensity when the maximum is defined as 100%. The maximum is the fluorescence intensity when a=0. Crystalline yield is the percentage of cracked crystals in the crystals obtained according crystalline growth using the CZ method. The relative fluorescence intensity increases with the increasing value a. However, crystalline yield increases for 0.032<a≤0.15. Thus, when the value a is set to be 0.032<a≤0.15, this produces high fluorescence intensity, the low level of afterglow, and high yield. When the value a is not greater than 0.032, this decreases crystalline yield. When the value a is greater than 0.15, this decreases both fluorescence intensity and crystalline yield.

In the case in which L is Lu, when the value x is set to be $0.033 \leq x \leq 0.5$ in view of the allowable range noted above, this particularly increases fluorescence intensity.

In the case in which L is Y, when the value x is set to be $0.066 \leq x \leq 0.67$ in view of the allowable range noted above, this particularly increases fluorescence intensity. FIG. 17 is directed to the case in which L is Y, a=0.10, z=0.0026, and u=0.41. FIG. 17 is a schematic diagram showing the dependence of the relative fluorescence intensity on the value x. In this case, the relative fluorescence intensity is the fluorescence intensity when the maximum is defined as 100%. The maximum is the fluorescence intensity when x=0. When the value x is smaller than 0.20, then as in the case of Lu, a heterogeneous phase is produced. This decreases fluorescence intensity. In addition, the production of a heterogeneous phase disadvantageously results easily in the production of cracks in the fluorescent material. In view of the relative fluorescence intensity, $0.066 \leq x$ is more preferable. In view of the production of cracks, $0.2 \leq x$ is yet more preferable. On the other hand, element Y is lighter than element Gd (Gd has an atomic mass of 157; Y has an atomic mass of 89). Therefore, when x is greater than 0.67, this decreases the density of the whole fluorescent material. This results in insufficient absorption of X-rays.

The component L may also be both Lu and Y. In this case, the above results are interpolated in that the ratio of Lu to Y is set at v:(1−v), (where 0<v<1), so as to obtain 0.0925v+0.2 (1−v)<x≤0.5v+0.67(1−v), thereby increasing the fluorescence intensity.

FIG. 18 is a schematic diagram showing the relationship between the content of Ce and the fluorescence intensity ratio of 800 nm to the maximum intensity of a 500 to 600 nm fluorescence spectrum. Element Fe is contained in $Gd_2O_3$, $Al_2O_3$, $Ga_2O_3$, etc. The content of Fe is 3 ppm (constant). As shown in FIG. 18, in the case in which the content of Fe is constant, when increasing the content of Ce, this decreases the level of fluorescence in the wavelength range of 700 to 850 nm. On the other hand, when increasing the content of Ce, this usually decreases fluorescence intensity. This is not preferable. FIG. 19 is a schematic diagram showing the relationship between the weight ratio (Fe/Ce) of the content of Fe to the content of Ce and the level of afterglow 3 ms after the termination of X-ray radiation. The inventors found that the weight ratio of the content of Fe to the content of Ce (Fe/Ce) was proportional to the level of afterglow 3 ms after the termination of X-ray radiation. It is desired that a fluorescent material to be used for a high-speed X-ray CT device produce not greater than 1500 ppm of an afterglow 3 ms after the termination of X-ray radiation. Therefore, a fluorescent material has preferably a weight ratio not greater than 3% of Fe to Ce. Furthermore, a fluorescent material has more preferably a weight ratio not greater than 0.5% of Fe to Ce because this decreases the level of afterglow 3 ms after the termination of X-ray radiation to a value that is not greater than 500 ppm. Thus, as in the fluorescent material according to the first embodiment, in this fluorescent material, the level of afterglow may be decreased by controlling the composition of Fe into this range.

The inventors found that, in this fluorescent material, regarding a fluorescent spectrum obtained when exciting the fluorescent material using an excitation light at a wavelength of 260 nm, the maximum fluorescence intensity in the wavelength range of 700 to 850 nm was correlated with the maximum fluorescence intensity in the wavelength range of 500 to 600 nm, and that when setting the ratio of the former to the latter at not greater than 8%, this particularly decreased the level of afterglow.

FIG. 20 is a schematic diagram showing, regarding a fluorescence spectrum obtained when exciting a predetermined material using an ultraviolet light at a wavelength of 260 nm, the relationship between the ratio of the maximum fluorescence intensity in the wavelength range of 700 to 850 nm to the maximum fluorescence intensity in the wavelength range of 500 to 600 nm and the level of afterglow 3 ms after the termination of X-ray radiation. As can be seen from FIG. 20, when the ratio of the maximum fluorescence intensity in the wavelength range of 700 to 850 nm to the maximum fluorescence intensity in the wavelength range of 500 to 600 nm is greater than 8%, this causes the level of afterglow 3 ms after the termination of X-ray radiation to become greater than 1500 ppm. It was found that, as a result, if the fluorescent material is to be used for a scintillator to be applied to a high-speed X-ray CT device, this would decrease image resolution. If the fluorescent material is such that the ratio of the maximum fluorescence intensity in the wavelength range of 700 to 850 nm to the maximum fluorescence intensity in the wavelength range of 500 to 600 nm is smaller then 3%, this causes the level of afterglow 3 ms after the termination of X-ray radiation to become smaller than 500 ppm. This is preferable.

In this fluorescent material, the ratio of the maximum fluorescence intensity in the wavelength range of 300 to 450 nm to the maximum fluorescence intensity in the wavelength range of 500 to 600 nm is preferably not greater than 7%. In general, in the above fluorescent material of GGAG:Ce, the level of afterglow in this wavelength range is very small. However, as can be seen from FIG. 21, which shows the relationship between the ratio of the maximum fluorescence intensity at a wavelength of 380 nm to the maximum fluorescence intensity in the wavelength range of 500 to 600 nm and the relative fluorescence intensity during the emission of X-rays, the greater the fluorescence intensity in this wavelength range becomes, the smaller the fluorescence intensity. When the ratio of the maximum fluorescence intensity in the wavelength range of 300 to 450 nm to the maximum fluorescence intensity in the wavelength range of 500 to 600 nm is greater than 7%, the fluorescence intensity decreases by not smaller than 20% compared with the case of the ratio being 1%. This decreases S/N of the detector in the X-ray CT scanner. Therefore, the ratio is desirably not greater than 7%.

The fluorescent materials according to the first and second embodiments may be polycrystal. A polycrystal is formed by sintering a mixture powder made of raw materials at a temperature lower than the melting point thereof. Alternatively, a polycrystal is formed, first, by calcining a mixture powder of raw materials, then by pulverizing the calcined powder, and finally by sintering the calcined powder at a temperature lower than the melting point thereof. If a polycrystal and a single crystal have the same structure, the light transmittance of the former is lower than that of the latter. Therefore, a polycrystal is inferior to a single crystal in performance, in particular, in fluorescence intensity. However, a polycrystal grows rapidly as opposed to a single crystal. This makes it possible to efficiently manufacture a polycrystal. This in turn makes a fluorescent material easily obtainable at low cost. If this type of a fluorescent is used as a scintillator, this makes it possible to obtain inexpensively a radiation detector having superior mass product.

The fluorescent materials according to the first and second embodiments may also be single crystal. Among the fluorescent materials described above, a single crystal one may have, in particular, an increased light transmittance for visible light. Therefore, even when increasing the thickness of the crystal, a fluorescence output may still be produced. This is preferable.

Third Embodiment

In the thirds embodiment, the above fluorescent material is used as a scintillator. The third embodiment relates to a radiation detector having this scintillator and a light receiving element. This element is designed to detect fluorescent light emitted from the scintillator. This radiation detector is preferably mounted in a medical observation device or a medical inspection device such as an X-ray CT (Computed Tomography) scanner, a PET (Positron Emission Tomography) scanner, or a PET/CT scanner.

If the above material is used as a scintillator, the problems of a decreased X-ray sensitivity, of X-ray leakage, etc., may be solved. Thus, a high-sensitivity radiation detector may be obtained.

As shown in FIGS. 22 and 23, this radiation detector may be designed to include a scintillator and a photodetector. The detector serves to detect fluorescent light emitted from this fluorescent material. FIG. 22 is a schematic perspective view of a radiation detector. FIG. 23 is a sectional view taken along line A-A in FIG. 22. The radiation detector according to this embodiment is composed of 24 scintillators 2, a light reflection film 3, a 24 channel silicon photodiode array 5, and a wiring substrate 4. The 24 scintillators 2 are formed by slicing a scintillator block into 24 pieces. One piece corresponds to one scintillator 2. The scintillators 2 are arrayed with a pitch of 1.2 mm. The film 3 is formed by applying a mixture of titania and an epoxy resin onto the upper surface of each scintillator 2 and the side surface thereof and curing the resultant film. The photodiodes 5 are made to correspond to the scintillators 2 such that each photodiode 5 has a size of 1 mm×30 mm, and that the photodiodes 5 are arrayed with a pitch of 1.2 mm, that the light receiving surface of the light receiving portion of each photodiode 5 is positioned so as to precisely correspond to the light receiving surface of the corresponding scintillator 2, and that each photodiode 5 is fixed to the corresponding scintillator 2 via epoxy resin. The substrate 4 has the photodiodes 5 electrically connected thereto.

A silicon photodiode to be used as a photodetector is desirably a PIN type silicon photodiode. The reason is: First, the photodiode has high sensitivity and a fast response. Second, the photodiode is sensitive to the wavelengths ranging from visible light to near infrared light. All this contributes to the good matching between the photodiode and the fluorescent material.

A scintillator (fluorescent material) to be used in this radiation detector desirably has a thickness of 0.5 to 10 mm. When a thickness is smaller than 0.5 mm, this decreases the level of fluorescence output and increases the level of leakage X-ray. On the other hand, a thickness greater than 5 mm decreases light transmittance, thereby decreasing fluorescence intensity. Therefore, either range of thickness is not preferable. In order to obtain a high-sensitivity radiation detector able to decrease the level of leakage X-ray and also able to produce a high fluorescence output, the thickness of such a scintillator is preferably 1.5 to 3 mm.

EXAMPLES

The present invention will be specifically described below based on preferred examples. These examples merely illustrate the invention. Thus, the fluorescent material according to the present invention is not limited thereto. Similarly, the radiation detector according to the present invention is not limited thereto.

A principal composition analysis was performed by an ICP-AES (Inductively Coupled Plasma Atomic Emission Spectrometry: OPTIMA-3300XL manufactured by Perkin Elmer). An analysis of Fe is performed by a GDMS (Glow Discharge Mass Spectrometry) (VG9000 manufactured by VG Elemental). Table 2 shows analytical values of polycrystalline fluorescent materials in examples 1 to 15 of the first embodiment, and in comparative examples 1 to 8. Table 3 shows chemical formula obtained from the analytical values. If the content of M is smaller than several ppm, i.e., if there is only a trace of M, a GDMS is preferably applied.

Example 1

A resin pot having a volume of 1 liter was provided. An amount of 200 g of a raw material, 1300 g of a high-purity alumina ball having a diameter of 5 mm, and 200 cc of ethanol were placed into the pot. After mixing the contents for 12 h, change in the mass of the alumina ball was 0.06 g. In view of this, and considering that $Al_2O_3$ from the ball of a ball mill will enter into the mixture, in order to achieve the composition of example 1 in table 2, 126.91 g of $Gd_2O_3$ (Fe: 0.4 mass ppm), 0.363 g of $CeO_2$, 40.62 g of $Al_2O_3$ (Fe: 0.2 mass ppm), and 32.05 g of $Ga_2O_3$ (Fe: 0.2 mass ppm) were weighed. Regarding a powder made of a $Gd_2O_3$ raw material, a powder having an average particle size of 2 μm was used (the average particle size refers to an median particle diameter herein). Regarding a powder made of an $Al_2O_3$ raw material, a powder having an average particle size of 0.6 μm was used. Regarding a powder made of a $Ga_2O_3$ raw material, a powder having an average particle size of 3 μm was used. Regarding the $Al_2O_3$ powder and the $Ga_2O_3$ powder, due to their great contents of Fe, the powders had been in advance heat treat at a temperature of 1400° C. for 3 h under a vacuum of app. 10 Pa. This decreased the content of Fe in the $Al_2O_3$ powder from 4 mass ppm to 0.2 mass ppm, the content of Fe in the $Ga_2O_3$ powder from 1 mass ppm to 0.2 mass ppm. These powders made of the raw materials were milled and mixed by a wet ball mill under the above conditions. Subsequently, the resultant mixture powder was dried. Subsequently, 1 mass % of pure water was added to the powder. Subsequently, the powder was uniaxially press molded at a pressure of 500 kg/cm². Subsequently, the powder was isostatically cold pressed at a pressure of 3 tons/cm². A compact was thereby obtained that had a density of 54% of the theoretical density. Subsequently, the compact was placed into an alumina pot. Subsequently, the pot was closed. Subsequently, the compact was primarily sintered at a temperature of 1675° C. for 3 h under a vacuum. A compact was thereby obtained that has a density of 99% of the theoretical density. Subsequently, the compact was isostatically hot pressed, i.e., sintered, at a temperature of 1500° C. for 3 h at a pressure of 1000 atm ($1.01 \times 10^5$ Pa) under an atmosphere of Ar. The resultant sintered body had a density of 99.9% of the theoretical density. The sample thus obtained was machined using an inner circumference slicer to a plate having a width of 1 mm, a length of 30 mm, and a thickness of 2.5 mm. Subsequently, the sample was heat treated at a temperature of 1500° C. for 2 h under an atmosphere of 100% oxygen by volume. Subsequently, the surface of the sample was optically polished so as to obtain a scintillator made of a polycrystalline fluorescent material. This scintillator was analyzed using a GDMS method. The content of Fe was thereby determined to be 0.35 mass ppm. The analytical value of the content of Fe in this synthesized scintillator is substantially equal to the content of Fe calculated from the content of Fe in each of the raw material powders and the compounding ratio thereof. As can be seen from this, the content of Fe is primarily dependent on the content of Fe in each of the raw material powders.

The fluorescent material obtained as described above was used as a scintillator so as to produce a radiation detector shown in FIGS. 22 and 23. This type of a radiation detector operates as follows: First, X-ray source 1 irradiates X-rays on a scintillator 2. This causes the scintillator 2 to be excited. The scintillator 2 emits thereby light. The light was detected by a 24 channel silicon photodiode array 5. The characteristics of the fluorescent material are thereby determined.

A signal amplifier was provided. The amplifier is designed to convert a current output signal from a silicon photodiode into a voltage signal. The amplifier is also designed to amplify the voltage signal. The amplifier was connected to the wiring substrate 4. This made it possible to obtain a signal amplifier designed to convert fluorescent light into visible light.

Example 2

A resin pot having a volume of 1 liter was provided. An amount of 180 g of a calcined power having a temperature of 1400° C., 1300 g of a high-purity alumina ball having a diameter of 5 mm, and 200 cc of ethanol were placed into the pot. After mixing the contents for 12 h, change in the mass of the alumina ball was 0.20 g. In view of this, and considering that $Al_2O_3$ from the ball of a ball mill will enter into the mixture powder (if the abrasion loss of the alumina ball produced by the milling and mixing operation is added thereto, the sum is 0.26 g), in order to obtain the composition in example 2 in table 2, 122.19 g of $Gd_2O_3$ (Fe: 0.1 mass ppm), 0.105 g of $CeO_2$, 30.77 g of $Al_2O_3$ (Fe: 0.1 mass ppm), and 46.68 g of $Ga_2O_3$ (Fe: 0.2 mass ppm) were weighed. Regarding a powder made of a $Gd_2O_3$ raw material, a powder having an average particle size of 2/U m was uses. Regarding a powder made of an $Al_2O_3$ raw material, a powder having an average particle size of 0.6 μm was used. Regarding a powder made of a $Ga_2O_3$ raw material, a powder having an average particle size of 3 μm was used. In order to decrease the content of Fe, the $Ga_2O_3$ powder and the $Al_2O_3$ powder were heat treated at 1500° C. for 3 h under a vacuum of approximately 10 Pa. Regarding the $Ga_2O_3$ powder, a $Ga_2O_3$ powder that had been in advance heat treated at 1400° C. for 3 h under a vacuum of approximately 10 Pa was used. This decreased the content of Fe in the $Gd_2O_3$ powder from 0.4 mass ppm to 0.1 mass ppm, in the $Al_2O_3$ powder from 4 mass ppm to 0.1 mass ppm, and in the $Ga_2O_3$ powder from 1 mass ppm to 0.2 mass ppm. These powders made of the raw materials were milled and mixed by a wet ball mill using a high-pure alumina ball of 5 mm diameter. Subsequently, the resultant mixture powder was dried. Subsequently, the powder was placed in an alumina pot of a B5 size. The powder was thereby sintered at 1400° C. for 2 h. Subsequently, the powder was cooled. Subsequently, the powder was sufficiently loosened. The resultant calcined powder was pulverized by a wet ball mill under the above conditions. Subsequently, the powder was dried. The resultant powder of a fluorescent material had an average size of 0.8 μm. Subsequently, 1 mass % of pure water was added to the powder. Subsequently, the powder was uniaxially press molded at a pressure of 500 kg/cm². Subsequently, the powder was isostatically cold pressed at a pressure of 3 tons/cm². A compact was thereby obtained that had a density of 67% of the theoretical density. Subsequently, the compact was placed into an alumina pot. Subsequently, the pot was closed. Subsequently, the compact was primarily sintered at a temperature of 1675° C. for 3 h under a vacuum. A compact was thereby obtained that has a density of 99% of the theoretical density. Subsequently, the compact was isostatically hot pressed, i.e., sintered, at a temperature of 1500° C. for 3 h at a pressure of 1000 atm ($1.01 \times 10^5$ Pa) under an atmosphere of Ar. The resultant sintered body had a density of 99.9% of the theoretical density. The sample thus obtained was machined using an inner circumference slicer to a plate having a width of 1 mm, a length of 30 mm, and a thickness of 2.5 mm. Subsequently, the sample was heat treated at a temperature of 1500° C. for 2 h under an atmosphere of 100% oxygen by volume. Subsequently, the surface of the sample was optically polished so as to obtain a scintillator made of a polycrystalline fluorescent material. This scintillator was analyzed using a GDMS method. The content of Fe was thereby determined to be 0.12 mass ppm.

Example 3

In order to obtain the composition in example 3 in table 2, 115.96 g of $Gd_2O_3$ (Fe: 0.4 mass ppm), 1.337 g of $CeO_2$, 21.95 g of $Al_2O_3$ (Fe: 4 mass ppm), and 60.69 g of $Ga_2O_3$ (Fe: 0.2 mass ppm) were weighed. Only the $Ga_2O_3$ powder that had been in advance heat treated at 1400° C. for 3 h under a vacuum of approximately 10 Pa was used. This decreased the content of Fe from 1 mass ppm to 0.2 mass ppm. Otherwise, the method similar to that in example 1 was applied to obtain a scintillator by use of a polycrystalline fluorescent material as a sample.

Example 4

In order to obtain the composition in example 4 in table 2, 119.25 g of $Gd_2O_3$ (Fe: 0.4 mass ppm), 6.91 g of $Lu_2O_3$ (Fe: 0.4 mass ppm), 0.359 g of $CeO_2$, 40.84 g of $Al_2O_3$ (Fe: 0.2 mass ppm), and 32.38 g of $Ga_2O_3$ (Fe: 1 mass ppm) were weighed. Only the $Al_2O_3$ powder had been in advance heat treated at 1400° C. for 3 h under a vacuum of approximately 10 Pa was used. This decreased the content of Fe from 4 mass ppm to 0.2 mass ppm. Otherwise, the method similar to that in example 2 was applied to obtain a scintillator by use of a polycrystalline fluorescent material as a sample.

Example 5

In order to obtain the composition in example 5 in table 2, 83.90 g of $Gd_2O_3$ (Fe: 0.4 mass ppm), 39.81 g of $Lu_2O_3$ (Fe: 0.4 mass ppm), 0.689 g of $CeO_2$, 30.13 g of $Al_2O_3$ (Fe: 1 mass ppm), and 45.41 g of $Ga_2O_3$ (Fe: 1 mass ppm) were weighed. Only the $Al_2O_3$ powder had been in advance heat treated at 1300° C. for 3 h under a vacuum of approximately 10 Pa was used. This decreased the content of Fe from 4 mass ppm to 1 mass ppm. Otherwise, the method similar to that in example 1 was applied to obtain a scintillator by use of a polycrystalline fluorescent material as a sample.

Example 6

In order to obtain the composition in example 6 in table 2, 60.07 g of $Gd_2O_3$ (Fe: 0.1 mass ppm), 66.34 g of $Lu_2O_3$ (Fe: 0.4 mass ppm), 0.338 g of $CeO_2$, 28.99 g of $Al_2O_3$ (Fe: 1 mass ppm), and 43.99 g of $Ga_2O_3$ (Fe: 0.2 mass ppm) were weighed. The $Gd_2O_3$ powder that had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 2 was applied to obtain a scintillator by use of a polycrystalline fluorescent material as a sample.

Example 7

In order to obtain the composition in example 7 in table 2, 113.86 g of $Gd_2O_3$ (Fe: 0.4 mass ppm), 6.64 g of $Lu_2O_3$ (Fe: 0.4 mass ppm), 1.034 g of $CeO_2$, 26.18 g of $Al_2O_3$ (Fe: 4 mass ppm), 46.18 g of $Ga_2O_3$ (Fe: 0.2 mass ppm), and 6.04 g of $Sc_2O_3$ (Fe: 0.4 mass ppm) were weighed. Only the $Ga_2O_3$ powder had been in advance heat treated at 1400° C. for 3 h under a vacuum of approximately 10 Pa was used. This decreased the content of Fe from 1 mass ppm to 0.2 mass ppm. Otherwise, the method similar to that in example 1 was applied to obtain a scintillator by use of a polycrystalline fluorescent material as a sample.

Example 8

In order to obtain the composition in example 8 in table 2, 114.55 g of $Gd_2O_3$ (Fe: 0.4 mass ppm), 6.66 g of $Lu_2O_3$ (Fe: 0.4 mass ppm), 0.691 g of $CeO_2$, 27.73 g of $Al_2O_3$ (Fe: 0.2 mass ppm), 46.32 g of $Ga_2O_3$ (Fe: 0.2 mass ppm), and 3.79 g of $Sc_2O_3$ (Fe: 0.4 mass ppm) were weighed. The $Al_2O_3$ powder had been in advance heat treated at 1400° C. for 3 h under a vacuum of approximately 10 Pa was used. This decreased the content of Fe from 4 mass ppm to 0.2 mass ppm. The $Ga_2O_3$ powder had been in advance heat treated at 1400° C. for 3 h under a vacuum of approximately Pa was used. This decreased the content of Fe from 1 mass ppm to 0.2 mass ppm. Otherwise, the method similar to that in example 2 was applied to obtain a scintillator by use of a polycrystalline fluorescent material as a sample.

Example 9

In order to obtain the composition in example 9 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 30.17 g of $Al_2O_3$ (Fe: 0.1 mass ppm), 46.49 g of $Ga_2O_3$ (Fe: 0.2 mass ppm), and 0.912 g of $Sc_2O_3$ (Fe: 0.4 mass ppm) were weighed. The $Gd_2O_3$ powder had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1500° C. for 3 h under a vacuum of approximately 10 Pa was used. This decreased the content of Fe from 4 mass ppm to 0.1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 1 was applied to obtain a scintillator by use of a polycrystalline fluorescent material as a sample.

Example 10

In order to obtain the composition in example 10 in table 2, 115.34 g of $Gd_2O_3$ (Fe: 0.1 mass ppm), 6.68 g of $Lu_2O_3$ (Fe:

0.4 mass ppm), 0.347 g of $CeO_2$, 29.97 g of $Al_2O_3$ (Fe: 1 mass ppm), 46.49 g of $Ga_2O_3$ (Fe: 0.2 mass ppm), 0.912 g of $Sc_2O_3$ (Fe: 0.4 mass ppm), and 0.003 g of $Mg(NO_3)_2 \cdot 6H_2O$ were weighed. The $Gd_2O_3$ powder had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 2 was applied to obtain a scintillator by use of a polycrystalline fluorescent material as a sample.

Example 11

In order to obtain the composition in example 11 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 30.17 g of $Al_2O_3$ (Fe: 1 mass ppm), 46.49 g of $Ga_2O_3$ (Fe: 0.2 mass ppm), 0.912 g of $Sc_2O_3$ (Fe: 0.4 mass ppm), and 0.027 g of $Mg(NO_3)_2 \cdot 6H_2O$ were weighed. The $Gd_2O_3$ powder had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 1 was applied to obtain a scintillator by use of a polycrystalline fluorescent material as a sample.

Example 12

In order to obtain the composition in example 12 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 29.97 g of $Al_2O_3$ (Fe: 1 mass ppm), 46.49 g of $Ga_2O_3$ (Fe: 0.2 mass ppm), 0.912 g of $Sc_2O_3$ (Fe: 0.4 mass ppm), and 0.003 g of $(C_4H_9O)_4Ti$ were weighed. The $Gd_2O_3$ powder had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 2 was applied to obtain a scintillator by use of a polycrystalline fluorescent material as a sample.

Example 13

In order to obtain the composition in example 13 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 30.17 g of $Al_2O_3$ (Fe: 1 mass ppm), 46.49 g of $Ga_2O_3$ (Fe: 0.2 mass ppm), 0.912 g of $Sc_2O_3$ (Fe: 0.4 mass ppm), and 0.036 g of $(C_4H_9O)_4Ti$ were weighed. The $Gd_2O_3$ powder had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 1 was applied to obtain a scintillator by use of a polycrystalline fluorescent material as a sample.

Example 14

In order to obtain the composition in example 14 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 29.97 g of $Al_2O_3$ (Fe: 1 mass ppm), 46.49 g of $Ga_2O_3$ (Fe: 0.2 mass ppm), 0.912 g of $Sc_2O_3$ (Fe: 0.4 mass ppm), and 0.003 g of $Ni(NO_3)_2 \cdot 6H_2O$ were weighed. The $Gd_2O_3$ powder had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 2 was applied to obtain a scintillator by use of a polycrystalline fluorescent material as a sample.

Example 15

In order to obtain the composition in example 15 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 30.17 g of $Al_2O_3$ (Fe: 1 mass ppm), 46.49 g of $Ga_2O_3$ (Fe: 0.2 mass ppm), 0.912 g of $Sc_2O_3$ (Fe: 0.4 mass ppm), and 0.029 g of $Ni(NO_3)_2 \cdot 6H_2O$ were weighed. The $Gd_2O_3$ powder had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 1 was applied to obtain a scintillator by use of a polycrystalline fluorescent material as a sample.

Comparative Example 1

In order to obtain the composition in comparative example 1 in table 2, 118.61 g of $Gd_2O_3$ (Fe: 0.4 mass ppm), 6.87 g of $Lu_2O_3$ (Fe: 0.4 mass ppm), 0.357 g of $CeO_2$, 28.82 g of $Al_2O_3$ (Fe: 4 mass ppm), 44.41 g of $Ga_2O_3$ (Fe: 2 mass ppm), 0.871 g of $Sc_2O_3$ (Fe: 0.4 mass ppm) were weighed. Otherwise, the method similar to that in example 1 was applied to obtain a scintillator by use of a polycrystalline fluorescent material as a sample.

Comparative Example 2

In order to obtain the composition in comparative example 2 in table 2, 113.33 g of $Gd_2O_3$ (Fe: 0.4 mass ppm), 6.69 g of $Lu_2O_3$ (Fe: 0.4 mass ppm), 2.314 g of $CeO_2$, 29.99 g of $Al_2O_3$ (Fe: 10 mass ppm), 46.51 g of $Ga_2O_3$ (Fe: 2 mass ppm), 0.913 g of $Sc_2O_3$ (Fe: 0.4 mass ppm) were weighed. Otherwise, the method similar to that in example 2 was applied to obtain a scintillator by use of a polycrystalline fluorescent material as a sample.

Comparative Example 3

In order to obtain the composition in comparative example 3 in table 2, 108.93 g of $Gd_2O_3$ (Fe: 0.4 mass ppm), 6.31 g of $Lu_2O_3$ (Fe: 0.4 mass ppm), 0.328 g of $CeO_2$, 15.22 g of $Al_2O_3$ (Fe: 8 mass ppm), 68.29 g of $Ga_2O_3$ (Fe: 2 mass ppm), 0.861 g of $Sc_2O_3$ (Fe: 0.4 mass ppm) were weighed. Otherwise, the method similar to that in example 1 was applied to obtain a scintillator by use of a polycrystalline fluorescent material as a sample.

Comparative Example 4

In order to obtain the composition in comparative example 4 in table 2, 114.01 g of $Gd_2O_3$ (Fe: 0.4 mass ppm), 6.61 g of $Lu_2O_3$ (Fe: 0.4 mass ppm), 0.343 g of $CeO_2$, 23.07 g of $Al_2O_3$ (Fe: 8 mass ppm), 45.95 g of $Ga_2O_3$ (Fe: 2 mass ppm), 9.766 g of $Sc_2O_3$ (Fe: 0.4 mass ppm) were weighed. Otherwise, the method similar to that in example 2 was applied to obtain a scintillator by use of a polycrystalline fluorescent material as a sample.

Comparative Example 5

In order to obtain the composition in comparative example 5 in table 2, 115.34 g of $Gd_2O_3$ (Fe: 0.4 mass ppm), 6.68 g of $Lu_2O_3$ (Fe: 0.4 mass ppm), 0.347 g of $CeO_2$, 30.17 g of $Al_2O_3$ (Fe: 4 mass ppm), 46.49 g of $Ga_2O_3$ (Fe: 2 mass ppm), 0.912 g of $Sc_2O_3$ (Fe: 0.4 mass ppm) were weighed. Otherwise, the method similar to that in example 1 was applied to obtain a scintillator by use of a polycrystalline fluorescent material as a sample.

Comparative Example 6

In order to obtain the composition in comparative example 6 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 29.97 g of $Al_2O_3$ (Fe: 1 mass ppm), 46.49 g of $Ga_2O_3$ (Fe: 0.2 mass ppm), 0.912 g of $SC_2O_3$ (Fe: 0.4 mass ppm), and 0.141 g of $Mg(NO_3)_2 \cdot 6H_2O$ were weighed. The $Gd_2O_3$ powder had been in advance heat treated at 1500° C. for 3 h under a vacuum of approximately Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 2 was applied to obtain a scintillator by use of a polycrystalline fluorescent material as a sample.

Comparative Example 7

In order to obtain the composition in comparative example 7 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 30.17 g of $Al_2O_3$ (Fe: 1 mass ppm), 46.49 g of $Ga_2O_3$ (Fe: 0.2 mass ppm), 0.912 g of $Sc_2O_3$ (Fe: 0.4 mass ppm), and 0.185 g of $(C_4H_9O)_4Ti$ were weighed. The $Gd_2O_3$ powder had been in advance heat treated at 1500° C. for 3 h under a vacuum of approximately 10 Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 1 was applied to obtain a scintillator by use of a polycrystalline fluorescent material as a sample.

Comparative Example 8

In order to obtain the composition in comparative example 8 in table 2, 115.34 g of $Gd_2O_3$ (Fe: 0.1 mass ppm), 6.68 g of $Lu_2O_3$ (Fe: 0.4 mass ppm), 0.347 g of $CeO_2$, 29.97 g of $Al_2O_3$ (Fe: 1 mass ppm), 46.49 g of $Ga_2O_3$ (Fe: 0.2 mass ppm), 0.912 g of $Sc_2O_3$ (Fe: 0.4 mass ppm), and 0.158 g of $Ni(NO_3)_2 \cdot 6H_2O$ were weighed. The $Gd_2O_3$ powder had been in advance heat treated at 1500° C. for 3 h under a vacuum of approximately Pa was used. This decreased the content of Fe from 0.4 mass ppm to 0.1 mass ppm. The $Al_2O_3$ powder was heat treated at 1300° C. for 3 h under a vacuum of approximately 10 Pa was used. This decreased the content of Fe from 4 mass ppm to 1 mass ppm. The $Ga_2O_3$ powder was heat treated at 1400° C. for 3 h under a vacuum of approximately 10 Pa was used. This decreased the content of Fe from 1 mass ppm to 0.2 mass ppm. Otherwise, the method similar to that in example 2 was applied to obtain a scintillator by use of a polycrystalline fluorescent material as a sample.

Regarding the samples in examples 1 to 15 and in comparative samples 1 to 8, the intensity of fluorescence caused by the emission of X-rays was measured. In addition, the level of afterglow 3 ms after the termination of X-ray radiation was measured. These measurements were evaluated as follows: First, a radiation detector indicated in example 1 was produced. Subsequently, a tungsten target X-ray tube was used as an X-ray source. Subsequently, the tube voltage was made 120 kV. In addition, the tube current was made 5 mA. Under these conditions, X-rays were emitted onto the scintillator of the radiation detector. The measurements were thereby evaluated. The relative intensity of fluorescence caused by the emission of X-rays and the level of afterglow 3 ms after the termination of X-ray radiation are indicated in Table 4. The relative fluorescence intensity is the fluorescence intensity when the fluorescence intensity of a GOS:Pr scintillator is defined as 100%.

In examples 1 to 3, examples 4 to 6, examples 7 to 9, and examples to 15, the fluorescent intensity was not smaller than 80%. In addition, the level of afterglow 3 ms after the termination of X-ray radiation was not greater than 800 ppm. In comparative examples 4 and 5, the fluorescent intensity was not smaller than 80%. However, the level of afterglow 3 ms after the termination of X-ray radiation was considerably greater than 800 ppm. In comparative examples 1 to 3, comparative examples 6 to 8, the fluorescent intensity is considerably smaller than 80%.

TABLE 2

| | Gd | Lu | Ce | Al | Ga | Sc | Fe Content (mass ppm) | M Content (mass ppm) |
|---|---|---|---|---|---|---|---|---|
| Example 1 | 55.1 | 0.00 | 0.148 | 10.8 | 11.9 | — | 0.35 | — |
| Example 2 | 53.0 | 0.00 | 0.043 | 8.21 | 17.4 | — | 0.12 | — |
| Example 3 | 50.3 | 0.00 | 0.545 | 5.83 | 22.6 | — | 0.96 | — |

TABLE 2-continued

|  | Gd | Lu | Ce | Al | Ga | Sc | Fe Content (mass ppm) | M Content (mass ppm) |
|---|---|---|---|---|---|---|---|---|
| Example 4 | 51.7 | 3.04 | 0.146 | 10.9 | 12.1 | — | 0.48 | — |
| Example 5 | 36.4 | 17.5 | 0.280 | 8.00 | 16.9 | — | 0.63 | — |
| Example 6 | 26.1 | 29.2 | 0.140 | 7.74 | 16.1 | — | 0.23 | — |
| Example 7 | 49.4 | 2.92 | 0.421 | 6.94 | 17.2 | 1.97 | 0.95 | — |
| Example 8 | 49.7 | 2.93 | 0.281 | 7.41 | 17.2 | 1.23 | 0.31 | — |
| Example 9 | 50.0 | 2.94 | 0.141 | 8.00 | 17.3 | 0.297 | 0.11 | — |
| Example 10 | 50.0 | 2.94 | 0.141 | 8.00 | 17.3 | 0.297 | 0.28 | 1.5 |
| Example 11 | 50.0 | 2.94 | 0.141 | 8.00 | 17.3 | 0.297 | 0.28 | 13 |
| Example 12 | 50.0 | 2.94 | 0.141 | 8.00 | 17.3 | 0.297 | 0.28 | 2.3 |
| Example 13 | 50.0 | 2.94 | 0.141 | 8.00 | 17.3 | 0.297 | 0.28 | 25 |
| Example 14 | 50.0 | 2.94 | 0.141 | 8.00 | 17.3 | 0.297 | 0.28 | 2.7 |
| Example 15 | 50.0 | 2.94 | 0.141 | 8.00 | 17.3 | 0.297 | 0.28 | 29 |
| Comparative Example 1 | 51.5 | 3.02 | 0.145 | 7.64 | 16.5 | 0.284 | 1.41 | — |
| Comparative Example 2 | 49.2 | 2.94 | 0.943 | 8.01 | 17.3 | 0.298 | 2.83 | — |
| Comparative Example 3 | 47.3 | 2.78 | 0.133 | 4.04 | 25.4 | 0.281 | 2.01 | — |
| Comparative Example 4 | 49.5 | 2.91 | 0.140 | 6.17 | 17.1 | 3.18 | 2.22 | — |
| Comparative Example 5 | 50.0 | 2.94 | 0.141 | 8.00 | 17.1 | 0.297 | 1.54 | — |
| Comparative Example 6 | 50.0 | 2.94 | 0.141 | 8.00 | 17.1 | 0.297 | 0.28 | 67 |
| Comparative Example 7 | 50.0 | 2.94 | 0.141 | 8.00 | 17.1 | 0.297 | 0.28 | 130 |
| Comparative Example 8 | 50.0 | 2.94 | 0.141 | 8.00 | 17.1 | 0.297 | 0.28 | 160 |

TABLE 4

|  | Relative Fluorescence Intensity (%) | Afterglow after 3 ms |
|---|---|---|
| Example 1 | 85 | 321 |
| Example 2 | 94 | 689 |
| Example 3 | 71 | 543 |
| Example 4 | 83 | 420 |
| Example 5 | 86 | 744 |
| Example 6 | 81 | 295 |
| Example 7 | 103 | 481 |
| Example 8 | 97 | 314 |
| Example 9 | 104 | 181 |
| Example 10 | 108 | 343 |
| Example 11 | 88 | 214 |
| Example 12 | 105 | 322 |
| Example 13 | 85 | 205 |
| Example 14 | 102 | 365 |
| Example 15 | 82 | 229 |
| Comparative Example 1 | 71 | 1011 |
| Comparative Example 2 | 74 | 1154 |
| Comparative Example 3 | 58 | 2981 |
| Comparative Example 4 | 99 | 1825 |
| Comparative Example 5 | 101 | 974 |
| Comparative Example 6 | 63 | 474 |
| Comparative Example 7 | 61 | 429 |
| Comparative Example 8 | 60 | 511 |

The second embodiment will be described in detail below with reference to examples 16 to 22, which relate to single crystalline fluorescent materials and polycrystalline fluorescent materials.

TABLE 3 composition $(Gd_{1-x-z}Lu_xCe_z)_{3+a}(Al_{1-u-s}Ga_uSc_s)_{5-a}O_{12}$

|  | a | x | z | u | s | Fe content (mass ppm) | Type of M | M content (mass ppm) |
|---|---|---|---|---|---|---|---|---|
| Example 1 | 0.05 | 0 | 0.003 | 0.3 | 0 | 0.35 | — | — |
| Example 2 | 0.03 | 0 | 0.0009 | 0.45 | 0 | 0.12 | — | — |
| Example 3 | 0 | 0 | 0.012 | 0.6 | 0 | 0.96 | — | — |
| Example 4 | 0.01 | 0.05 | 0.003 | 0.3 | 0 | 0.48 | — | — |
| Example 5 | 0.06 | 0.3 | 0.006 | 0.45 | 0 | 0.63 | — | — |
| Example 6 | 0.12 | 0.8 | 0.003 | 0.45 | 0 | 0.23 | — | — |
| Example 7 | 0.03 | 0.05 | 0.009 | 0.45 | 0.08 | 0.95 | — | — |
| Example 8 | 0.03 | 0.05 | 0.006 | 0.45 | 0.05 | 0.31 | — | — |
| Example 9 | 0.03 | 0.05 | 0.003 | 0.45 | 0.012 | 0.11 | — | — |
| Example 10 | 0.03 | 0.05 | 0.003 | 0.45 | 0.012 | 0.28 | Mg | 1.5 |
| Example 11 | 0.03 | 0.05 | 0.003 | 0.45 | 0.012 | 0.28 | Mg | 13 |
| Example 12 | 0.03 | 0.05 | 0.003 | 0.45 | 0.012 | 0.28 | Ti | 2.3 |
| Example 13 | 0.03 | 0.05 | 0.003 | 0.45 | 0.012 | 0.28 | Ti | 25 |
| Example 14 | 0.03 | 0.05 | 0.003 | 0.45 | 0.012 | 0.28 | Ni | 2.7 |
| Example 15 | 0.03 | 0.05 | 0.003 | 0.45 | 0.012 | 0.28 | Ni | 29 |
| Comparative Example 1 | 0.17 | 0.05 | 0.003 | 0.45 | 0.012 | 1.41 | — | — |
| Comparative Example 2 | 0.03 | 0.05 | 0.02 | 0.45 | 0.012 | 2.83 | — | — |
| Comparative Example 3 | 0.03 | 0.05 | 0.003 | 0.7 | 0.012 | 2.01 | — | — |
| Comparative Example 4 | 0.03 | 0.05 | 0.003 | 0.45 | 0.13 | 2.22 | — | — |
| Comparative Example 5 | 0.03 | 0.05 | 0.003 | 0.45 | 0.012 | 1.54 | — | — |
| Comparative Example 6 | 0.03 | 0.05 | 0.003 | 0.45 | 0.012 | 0.28 | Mg | 67 |
| Comparative Example 7 | 0.03 | 0.05 | 0.003 | 0.45 | 0.012 | 0.28 | Ti | 130 |
| Comparative Example 8 | 0.03 | 0.05 | 0.003 | 0.45 | 0.012 | 0.28 | Ni | 160 |

Example 16

In order to obtain the composition in example 16 in table 5, 486.65 g of $Gd_2O_3$, 60.68 g of $Lu_2O_3$, 26.053 g of Ce $(NO_3)_3 \cdot 6H_2O$, 151.41 g of $Al_2O_3$, 185.57 g of $Ga_2O_3$ were weighed. Element Ce is poorly incorporated into a single crystal. Therefore, an amount of 6.56 times the target compositional mass thereof was weighed. These raw materials were milled and mixed by a wet ball mill. Subsequently, the powder was placed in an alumina pot of a B5 size. The powder was thereby sintered at 1400° C. for 2 h. Subsequently, the powder was cooled. Subsequently, the powder was sufficiently loosened. Subsequently, the resultant powder was filled into a rubber tube and was isostatically cold pressed at a pressure of 98 MPa. A bar-shaped compact was thereby obtained. Subsequently, the compact was melted in an iridium crucible at a radio frequency. Subsequently, a seed crystal was immersed in the melt. Subsequently, the seed crystal was lifted a velocity of 1 mm/h and a rotational velocity of 20 rpm. Thus, a single crystal having a size of 2 inches was grown using a CZ method. This was performed under an atmosphere of a nitrogen gas containing 3% of oxygen by volume. The growth orientation was <111>. The crystal thus obtained was machined using an inner circumference slicer to a plate having a width of 1 mm, a length of 30 mm, and a thickness of 3 mm. Subsequently, the sample was heat treated at a temperature of 1500° C. for 2 h under an atmosphere of 100% oxygen by volume. Subsequently, the surface of the sample was optically polished so as to obtain a scintillator made of a single crystalline fluorescent material.

The above fluorescent material as a scintillator was used for a radiation detector as in the above example so as to determine the characteristics of this fluorescent material.

Example 17

In order to obtain the composition in example 17 in table 5, 382.44 g of $Gd_2O_3$, 210.00 g of $Y_2O_3$, 26.053 g of Ce $(NO_3)_3 \cdot 6H_2O$, 175.88 g of $Al_2O_3$, 135.90 g of $Ga_2O_3$ were weighed. Otherwise, the method similar to that in example 16 was applied to obtain a scintillator by use of a single crystalline fluorescent material as a sample.

Example 18

In order to obtain the composition in example 18 in table 5, 486.65 g of $Gd_2O_3$, 60.68 g of $Lu_2O_3$, 26.053 g of Ce $(NO_3)_3 \cdot 6H_2O$, 151.41 g of $Al_2O_3$, 185.57 g of $Ga_2O_3$ were weighed. Otherwise, the method similar to that in example 16 was applied to obtain a scintillator by use of a single crystalline fluorescent material as a sample.

Example 19

In order to obtain the composition in example 19 in table 5, 495.87 g of $Gd_2O_3$, 60.68 g of $Lu_2O_3$, 3.973 g of Ce $(NO_3)_3 \cdot 6H_2O$, 151.41 g of $Al_2O_3$, 185.57 g of $Ga_2O_3$ were weighed. Regarding each of a powder made of a $Gd_2O_3$ raw material and a $Lu_2O_3$ raw material, a powder having an average particle size of 0.1 μm was used. Regarding a powder made of an $Al_2O_3$ raw material, a powder having an average particle size of 0.6 μm was used. Regarding a powder made of a $Ga_2O_3$ raw material, a powder having an average particle size of 3 μm was used. These powders made of the raw materials were milled and mixed by a wet ball mill using a high-purity alumina ball having a diameter of 5 mm. Subsequently, the resultant mixture powder was dried. This mixture power was observed using a scanning electron microscope. No significant difference in average particle size was observed between different types of raw materials. Subsequently, the powder was placed in an alumina pot of a B5 size. The powder was thereby sintered at 1400° C. for 2 h. Subsequently, the powder was cooled. Subsequently, the powder was sufficiently loosened. The resultant calcined powder was pulverized by a wet ball mill using a high purity alumina ball having a diameter of 5 mm. Subsequently, the powder was dried. The resultant powder of a fluorescent material had an average particle size of 0.8 μm. Subsequently, 0.1 mass % of pure water was added to the powder. Subsequently, the powder was uniaxially press molded at a pressure of 1000 kg/cm². Subsequently, the powder was isostatically cold pressed at a pressure of 3 tons/cm². A compact was thereby obtained that had a density of 64% of the theoretical density. Subsequently, the compact was placed into an alumina pot. Subsequently, the pot was closed.

Subsequently, the compact was primarily sintered at a temperature of 1625° C. for 3 h under a vacuum. A compact was thereby obtained that has a density of 99% of the theoretical density. Subsequently, the compact was isostatically hot pressed, i.e., sintered, at a temperature of 1500° C. for 3 h at a pressure of 1000 atm under an atmosphere of Ar. The resultant sintered body had a density of 99.9% of the theoretical density. The sample thus obtained was machined using an inner circumference slicer to a plate having a width of 1 mm, a length of 30 mm, and a thickness of 3 mm. Subsequently, the sample was heat treated at a temperature of 1500° C. for 2 h under an atmosphere of 100% oxygen by volume. Subsequently, the surface of the sample was optically polished so as to obtain a scintillator made of a polycrystalline fluorescent material.

Example 20

In order to obtain the composition in example 20 in table 5, 383.10 g of $Gd_2O_3$, 182.05 g of $Lu_2O_3$, 9.271 g of Ce $(NO_3)_3 \cdot 6H_2O$, 151.41 g of $Al_2O_3$, 185.57 g of $Ga_2O_3$ were weighed. Regarding each of a powder made of a $Gd_2O_3$ raw material and a $Lu_2O_3$ raw material, a powder having an average particle size of 3 μm was used. Regarding a powder made of an $Al_2O_3$ raw material, a powder having an average particle size of 0.6 μm was used. Regarding a powder made of a $Ga_2O_3$ raw material, a powder having an average particle size of 3 μm was used. These powders made of the raw materials were milled and mixed by a wet ball mill using a high-purity alumina ball having a diameter of 5 mm. Subsequently, the resultant mixture powder was dried. This mixture power was observed using a scanning electron microscope. Each of the raw powders was pulverized to have a particle size of not greater than 1 μm. Subsequently, the method similar to that in example 19 was applied to obtain a scintillator by use of a polycrystalline fluorescent material as a sample.

Example 21

In order to obtain the composition in example 21 in table 5, 387.69 g of $Gd_2O_3$, 210.00 g of $Y_2O_3$, 13.461 g of Ce $(NO_3)_3 \cdot 6H_2O$, 175.88 g of $Al_2O_3$, 135.90 g of $Ga_2O_3$ were weighed. Regarding each of a powder made of a $Gd_2O_3$ raw material and a $Y_2O_3$ raw material, a powder having an average particle size of 0.1 μm was used. Regarding a powder made of an $Al_2O_3$ raw material, a powder having an average particle size of 0.6 μm was used. Regarding a powder made of a $Ga_2O_3$ raw material, a powder having an average particle size of 3 μm in was used. These powders made of the raw materials were milled and mixed by a wet ball mill using a resin ball having a diameter of 10 mm. Subsequently, the resultant mixture powder was dried. This mixture power was observed using a scanning electron microscope. No significant difference in average particle size was observed between different types of raw materials. Subsequently, the method similar to that in example 19 was applied to obtain a scintillator by use of a polycrystalline fluorescent material as a sample.

Example 22

In order to obtain the composition in example 22 in table 5, 391.62 g of $Gd_2O_3$, 210.00 g of $Y_2O_3$, 4.038 g of Ce$(NO_3)_3 \cdot 6H_2O$, 124.90 g of $Al_2O_3$, 229.62 g of $Ga_2O_3$ were weighed. Otherwise, the method similar to that in example 19 was applied to obtain a scintillator by use of a polycrystalline fluorescent material as a sample. Regarding each of a powder made of a $Gd_2O_3$ raw material and a $Lu_2O_3$ raw material, a powder having an average particle size of 3 μm was used. Regarding a powder made of an $Al_2O_3$ raw material, a powder having an average particle size of 0.6 μm was used. Regarding a powder made of a $Ga_2O_3$ raw material, a powder having an average particle size of 3 μm was used. These powders made of the raw materials were milled and mixed by a wet ball mill using a resin ball having a diameter of 10 mm. Subsequently, the resultant mixture powder was dried. This mixture power was observed using a scanning electron microscope. No significant difference in average particle size was observed between different types of raw materials. Subsequently, the method similar to that in example 19 was applied to obtain a scintillator by use of a polycrystalline fluorescent material as a sample.

Comparative Example 9

In order to obtain the composition in comparative example 9 in table 5, 495.72 g of $Gd_2O_3$, 60.68 g of $Lu_2O_3$, 4.342 g of Ce$(NO_3)_3 \cdot 6H_2O$, 151.41 g of $Al_2O_3$, 185.57 g of $Ga_2O_3$ were weighed. Otherwise, the method similar to that in example 16 was applied to obtain a scintillator by use of a single crystalline fluorescent material as a sample.

Comparative Example 10

In order to obtain the composition in comparative example 10 in table 5, 558.25 g of $Gd_2O_3$, 8.684 g of Ce$(NO_3)_3 \cdot 6H_2O$, 124.90 g of $Al_2O_3$, 229.62 g of $Ga_2O_3$ were weighed. Otherwise, the method similar to that in example 16 was applied to obtain a scintillator by use of a single crystalline fluorescent material as a sample.

Comparative Example 11

In order to obtain the composition in comparative example 11 in table 5, 497.25 g of $Gd_2O_3$, 60.68 g of $Lu_2O_3$, 0.662 g of Ce$(NO_3)_3 \cdot 6H_2O$, 151.41 g of $Al_2O_3$, 185.57 g of $Ga_2O_3$ were weighed. Otherwise, the method similar to that in example 18 was applied to obtain a scintillator by use of a polycrystalline fluorescent material as a sample. Regarding each of a powder made of a $Gd_2O_3$ raw material and a $Lu_2O_3$ raw material, a powder having an average particle size of 3 μm was used. Regarding a powder made of an $Al_2O_3$ raw material, a powder having an average particle size of 0.6 μm was used. Regarding a powder made of a $Ga_2O_3$ raw material, a powder having an average particle size of 3 μm was used. These powders made of the raw materials were milled and mixed by a wet ball mill using a resin ball having a diameter of 10 mm. Subsequently, the resultant mixture powder was dried. This mixture power was observed using a scanning electron microscope. No significant difference in average particle size was observed between different types of raw materials. Subsequently, the method similar to that in example 19 was applied to obtain a scintillator by use of a polycrystalline fluorescent material as a sample.

Regarding the samples in examples 16 to 22 and in comparative examples 9 to 11, fluorescence spectra were measured using ultraviolet light having a wavelength of 260 nm. The measurements of the fluorescence spectra were performed using samples having an 10 mm square and a thickness of 2 mm. In addition, the fluorescence intensity produced by the emission of X-rays and the level of afterglow 3 ms after the termination of X-ray radiation were measured. These measurements were evaluated as follows: First, a radiation detector as described above was produced. Subsequently, a tungsten target X-ray tube was used as an X-ray source. X-rays were emitted onto the radiation detector at a tube voltage of 120 kV and a tube current of 5 mA. The measurements were thereby evaluated. Regarding a spectrum of each sample, the ratio (fluorescence intensity ratio A) of the maximum fluorescence intensity in the wavelength range of 700 to 850 nm to the maximum fluorescence intensity in the wavelength of 500 to 600 nm, the ratio (fluorescence intensity ratio B) of the fluorescence intensity at a wavelength of 370 nm to the maximum fluorescence intensity in the wavelength of 500 to 600 nm, the relative fluorescence intensity produced by the emission of X-rays, and the level of afterglow 3 ms after the termination of X-ray radiation are shown in table 6. In example 16 to 20, in which the fluorescence intensity ratio A is not greater than 8%, the level of afterglow 3 ms after the termination of X-ray radiation was considerably smaller than 1500 ppm. In comparative example 9 to 11, in which the fluorescence intensity ratio A exceeds 8%, the level of afterglow 3 ms after the termination of X-ray radiation was considerably greater than 1500 ppm. On the other hand, in examples 16 to 20 and in comparative examples 9 and 10, in which the fluorescence intensity ratio B is not more than 7%, the relative fluorescence intensity was not smaller than 80%. However, in comparative example 3, in which the relative intensity ratio B exceeds 7%, the relative fluorescence intensity was smaller than 80%.

TABLE 5

| | composition $(Gd_{1-x-z}L_xCe_z)_{3+a}(Al_{1-u}Ga_u)_{5-a}O_{12}$ | | | | | Fe/Ce mass ratio | |
|---|---|---|---|---|---|---|---|
| | a | x | z | u | L | (%) | Remarks |
| Example 16 | 0.05 | 0.1 | 0.003 | 0.4 | Lu | 0.15 | Singlecrystal |
| Example 17 | 0.1 | 0.3 | 0.003 | 0.5 | Y | 0.25 | Singlecrystal |
| Example 18 | 0.05 | 0.1 | 0.003 | 0.4 | Lu | 1.95 | Singlecrystal |
| Example 19 | 0.05 | 0.1 | 0.003 | 0.4 | Lu | 0.98 | Polycrystal |
| Example 20 | 0.05 | 0.3 | 0.007 | 0.4 | Lu | 0.1 | Polycrystal |
| Example 21 | 0.1 | 0.3 | 0.01 | 0.5 | Y | 0.05 | Polycrystal |
| Example 22 | 0.1 | 0.3 | 0.003 | 0.5 | Y | 2.78 | Polycrystal |
| Comparative Example 9 | 0.05 | 0.1 | 0.0005 | 0.4 | Lu | 4.48 | Singlecrystal |
| Comparative Example 10 | 0.1 | 0 | 0.001 | 0.5 | — | 3.9 | Singlecrystal |
| Comparative Example 11 | 0.05 | 0.1 | 0.0005 | 0.4 | Lu | 4.45 | Polycrystal |

TABLE 6

| | Fluorescence Intensity Ratio A (%) | Fluorescence Intensity Ratio B (%) | Relative Fluorescence Intensity (%) | Afterglow after 3 ms (ppm) |
|---|---|---|---|---|
| Example 16 | 2.8 | 0.9 | 100 | 490 |
| Example 17 | 3.8 | 0.3 | 96 | 630 |
| Example 18 | 6.4 | 0.5 | 88 | 1170 |
| Example 19 | 4.8 | 3.3 | 94 | 780 |
| Example 20 | 2.0 | 2.5 | 87 | 380 |
| Example 21 | 1.0 | 6.5 | 80 | 190 |
| Example 22 | 7.5 | 31.2 | 65 | 1440 |
| Comparative Example 9 | 12.0 | 0.5 | 95 | 2060 |
| Comparative Example 10 | 10.3 | 1.3 | 93 | 1830 |
| Comparative Example 11 | 11.3 | 15.7 | 71 | 1990 |

Figure 1:
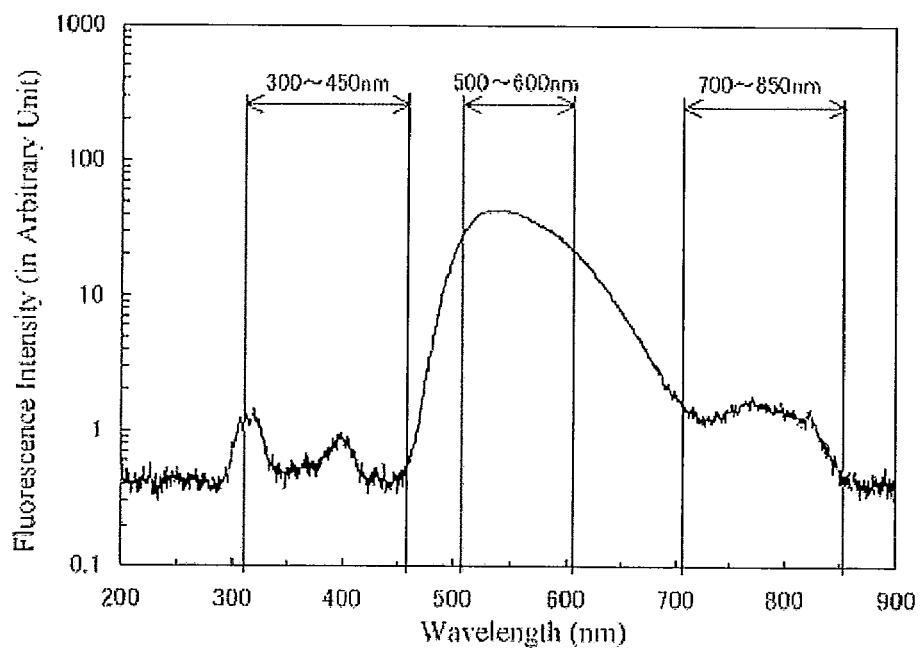
FIG. 1 is a schematic diagram of a fluorescent spectrum of a single crystalline fluorescent material according to the present invention.
Figure 2:
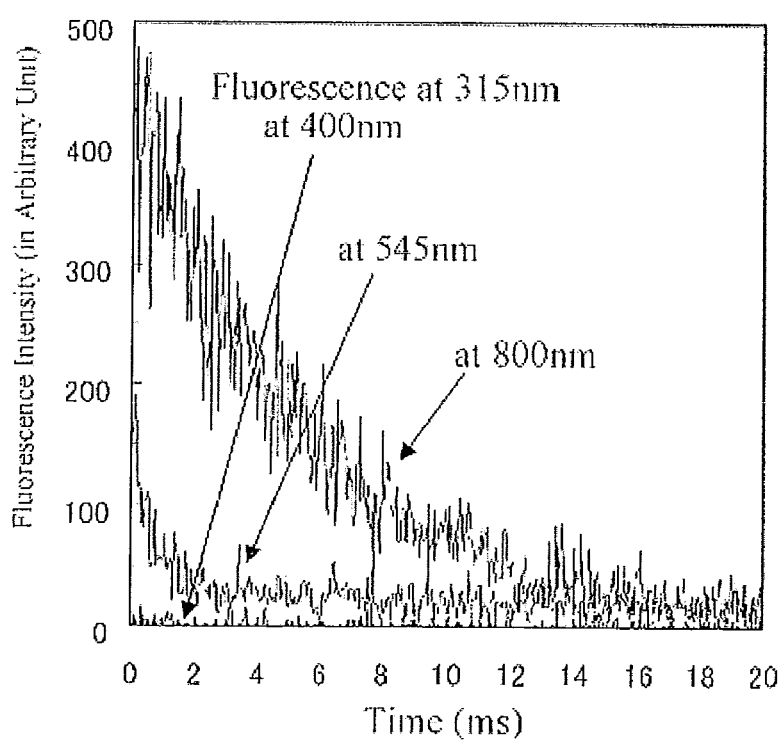
FIG. 2 is a schematic diagram of afterglow profiles of the fluorescent material shown in FIG. 1.
Figure 3:
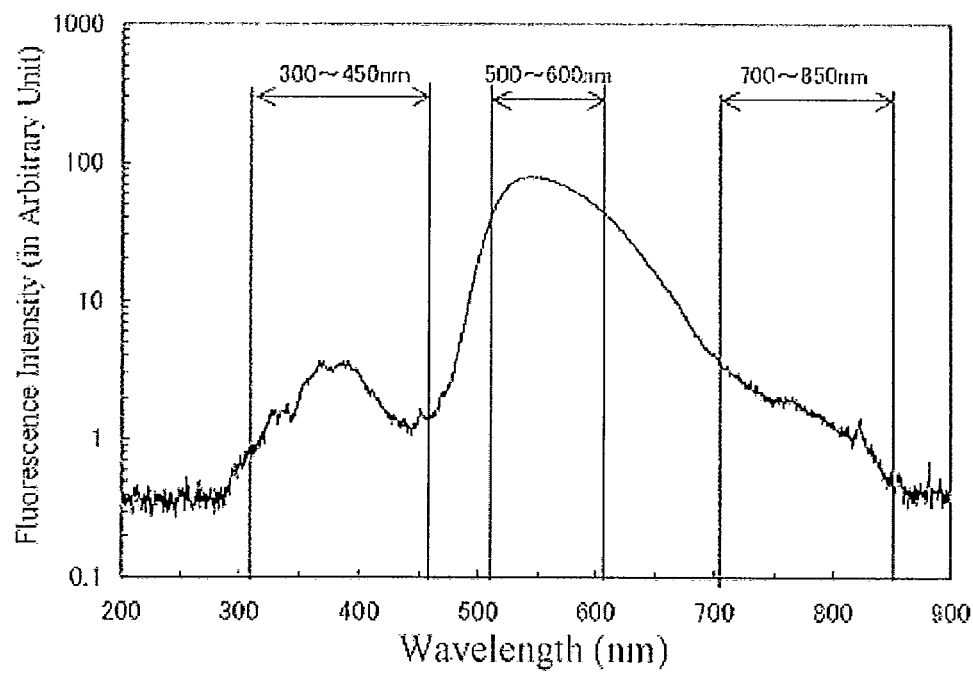
FIG. 3 is a schematic diagram of a fluorescent spectrum of a polycrystalline fluorescent material according to the present invention.
Figure 4:
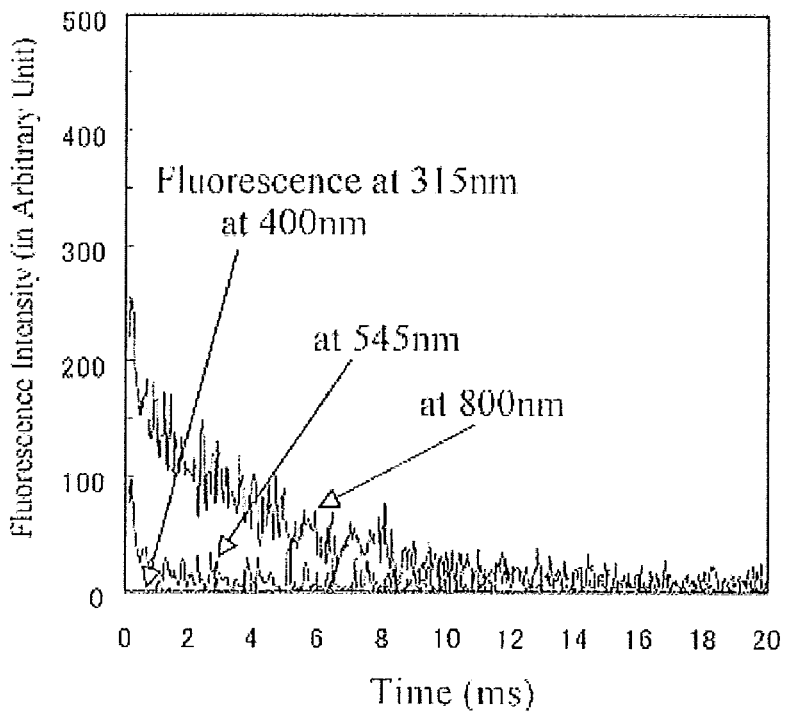
FIG. 4 is a schematic diagram of afterglow profiles of the fluorescent material shown in FIG. 3.
Figure 5:
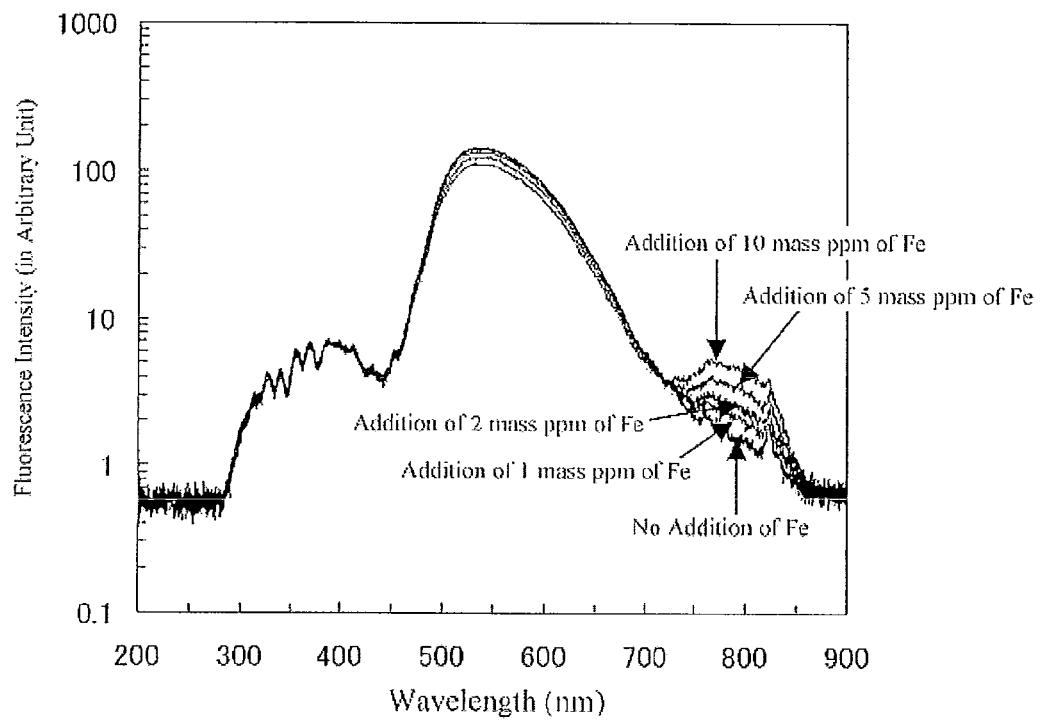
FIG. 5 is a schematic diagram of a fluorescent spectrum of a polycrystalline fluorescent material having Fe added thereto.
Figure 6:
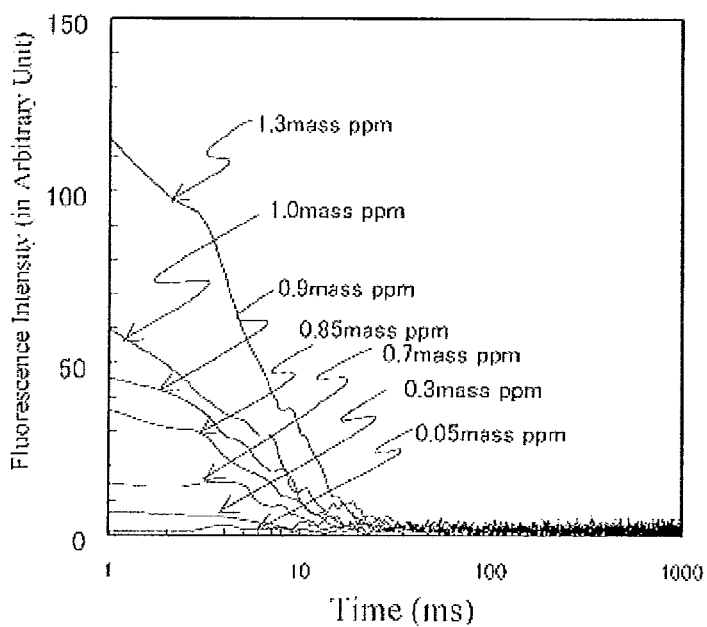
FIG. 6 is a schematic diagram showing the afterglow profiles at a wavelength of 800 nm of fluorescent materials having different content of Fe.
Figure 7:
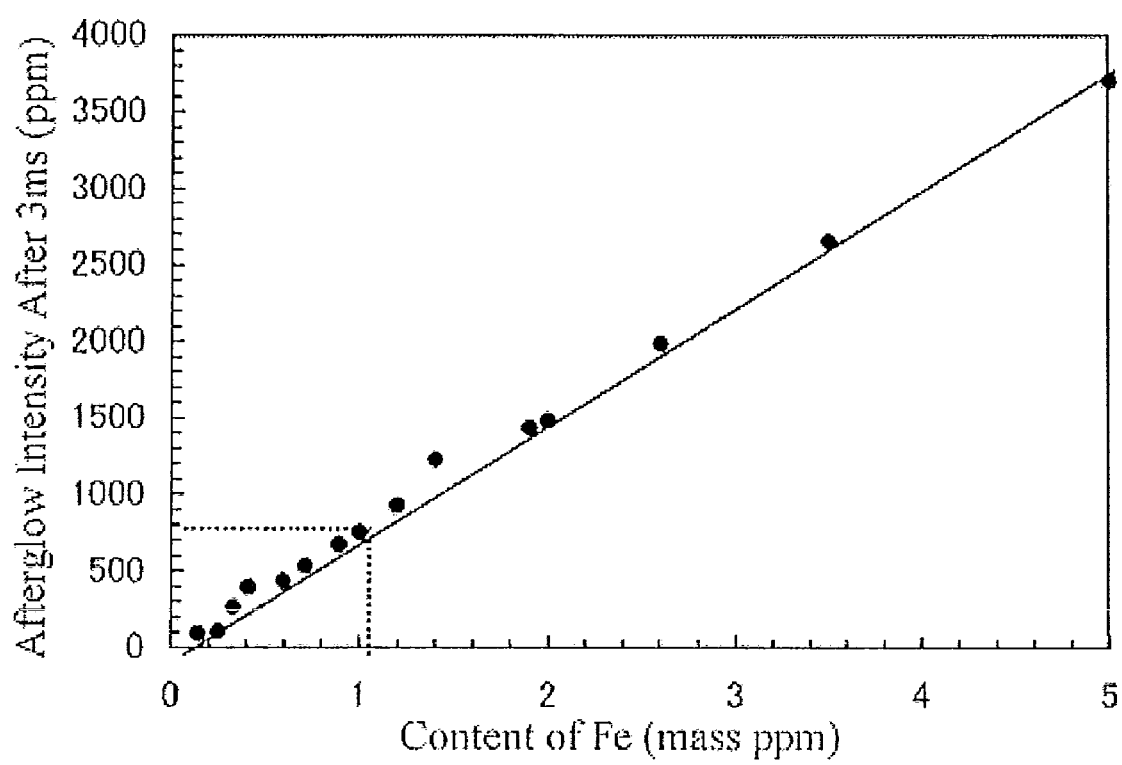
FIG. 7 is a schematic diagram of the relationship between the content of Fe and the level of a 3 ms afterglow of a fluorescent material according to the present invention.
Figure 8:
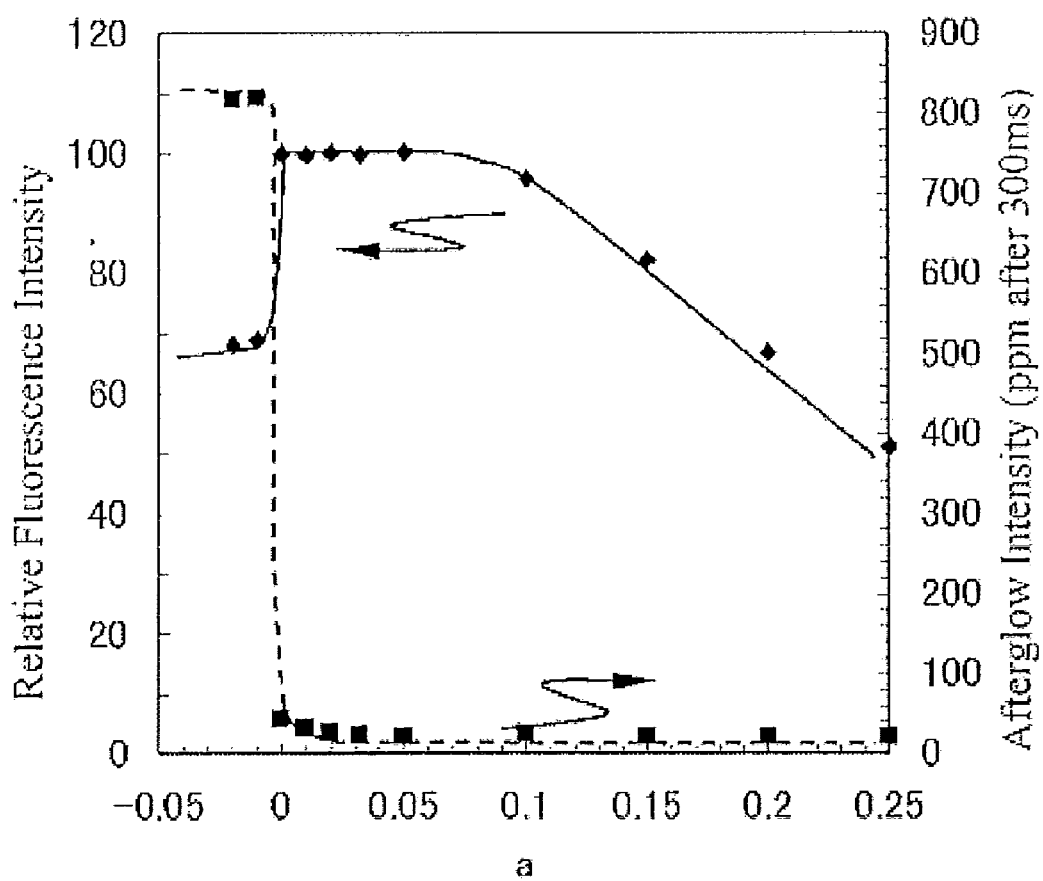
FIG. 8 is a schematic diagram showing the dependence of the relative fluorescence intensity and of the 300 ms afterglow on the value a according to an embodiment of the present invention.
Figure 9:
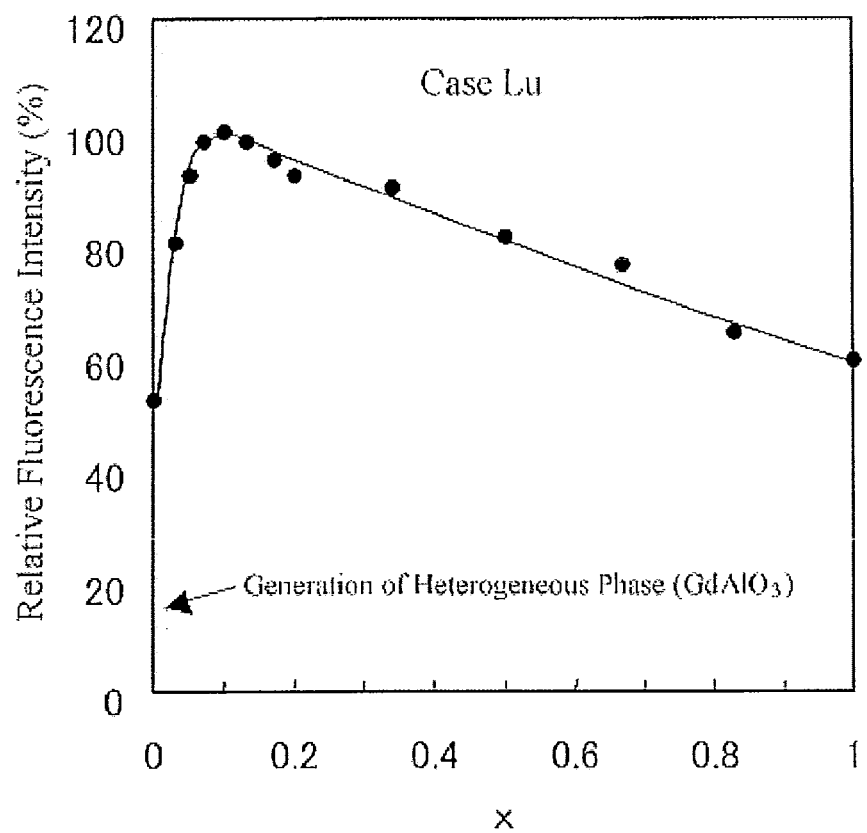
FIG. 9 is a schematic diagram showing the dependence of the fluorescence intensity on the value x according to an embodiment of the present invention.
Figure 10:
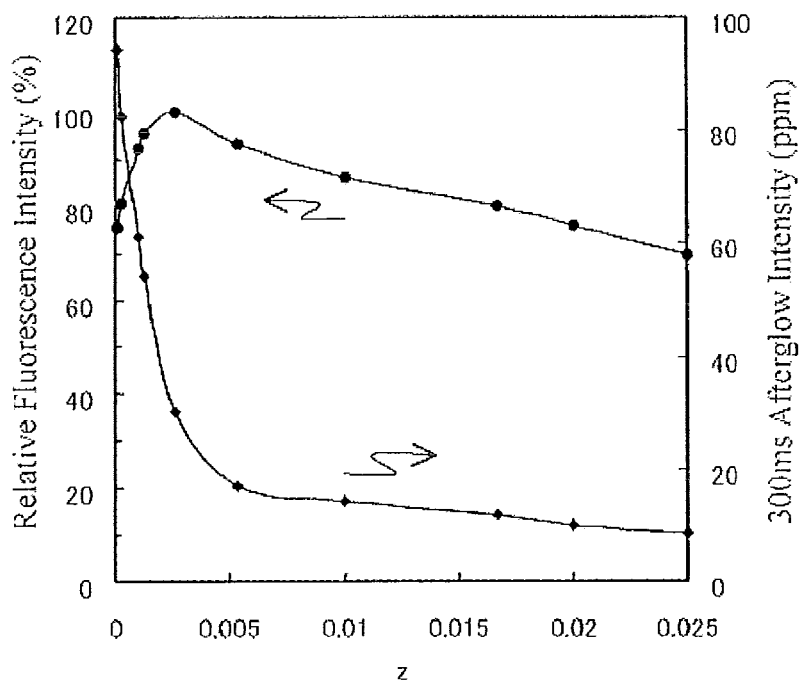
FIG. 10 is a schematic diagram showing the dependence of the relative fluorescence intensity and of the 3 ms afterglow on the value z according to an embodiment of the present invention.
Figure 11:
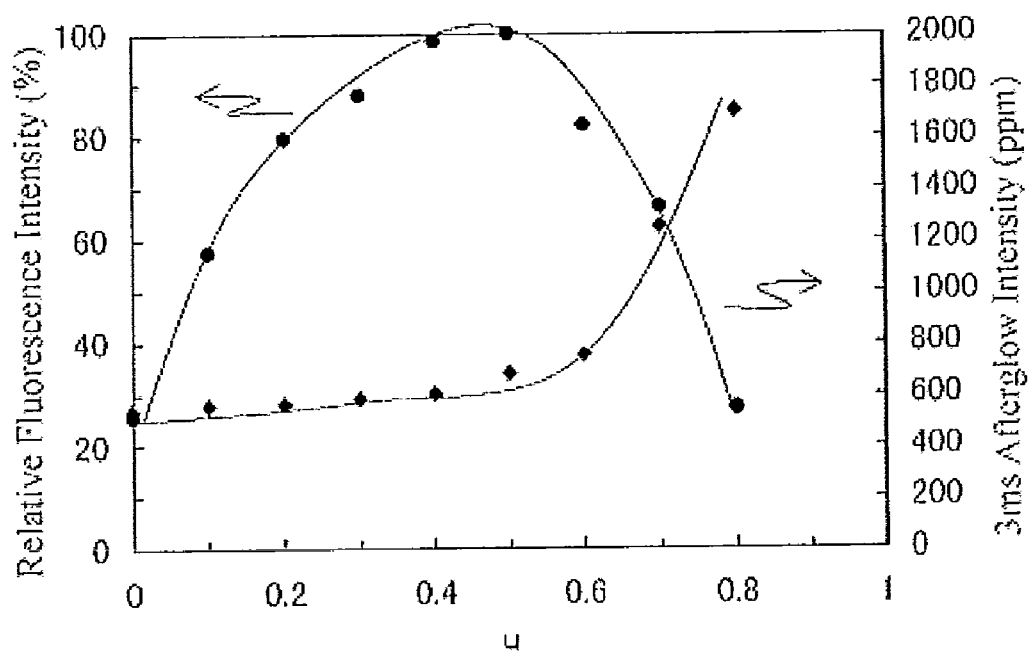
FIG. 11 is a schematic diagram showing the dependence of the relative fluorescence intensity and of the 3 ms afterglow on the value u according to an embodiment of the present invention.
Figure 12:
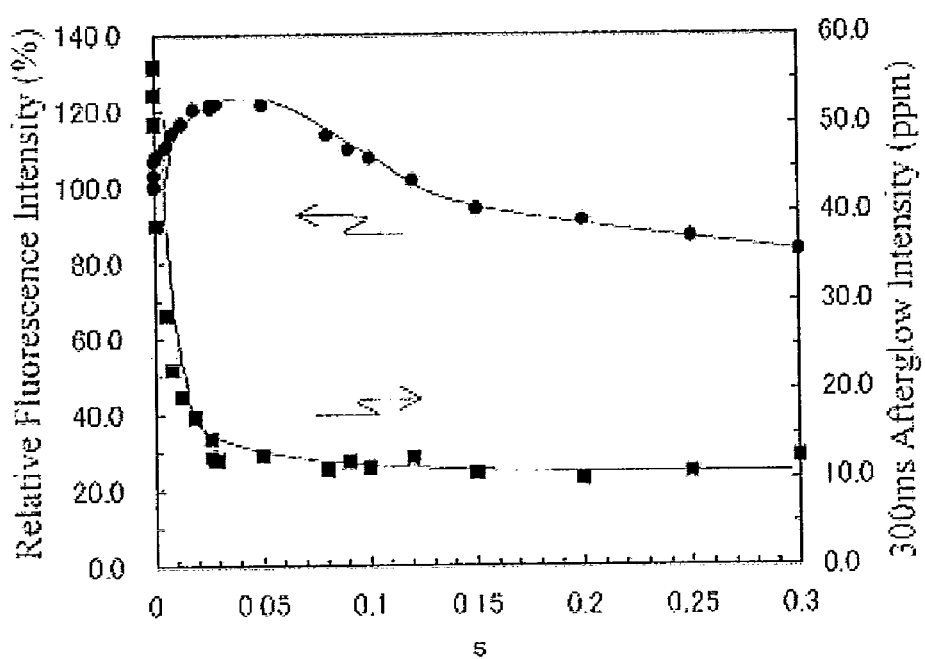
FIG. 12 is a schematic diagram showing the dependence of the relative fluorescence intensity and of the 300 ms afterglow on the value s according to an embodiment of the present invention.
Figure 13:
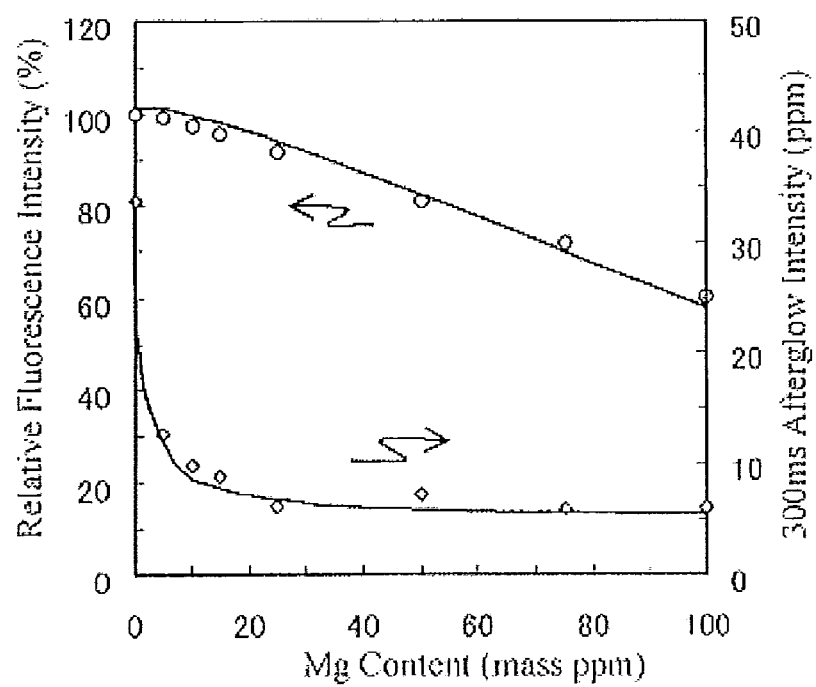
FIG. 13 is a schematic diagram showing the dependence of the relative fluorescence intensity and of the 300 ms afterglow on the content of Mg according to an embodiment of the present invention.
Figure 14:
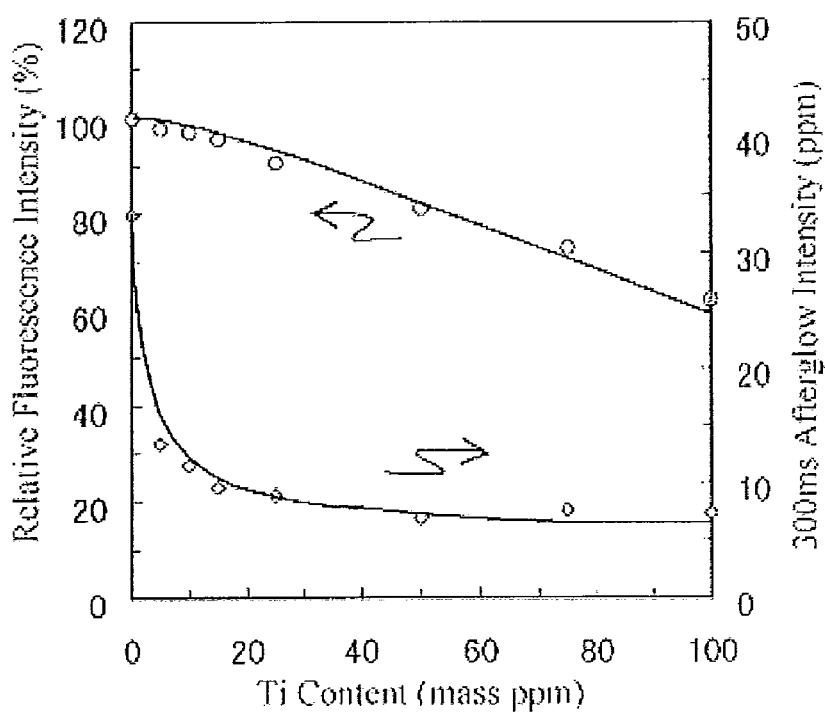
FIG. 14 is a schematic diagram showing the dependence of the relative fluorescence intensity and of the 300 ms afterglow on the content of Ti according to an embodiment of the present invention.
Figure 15:
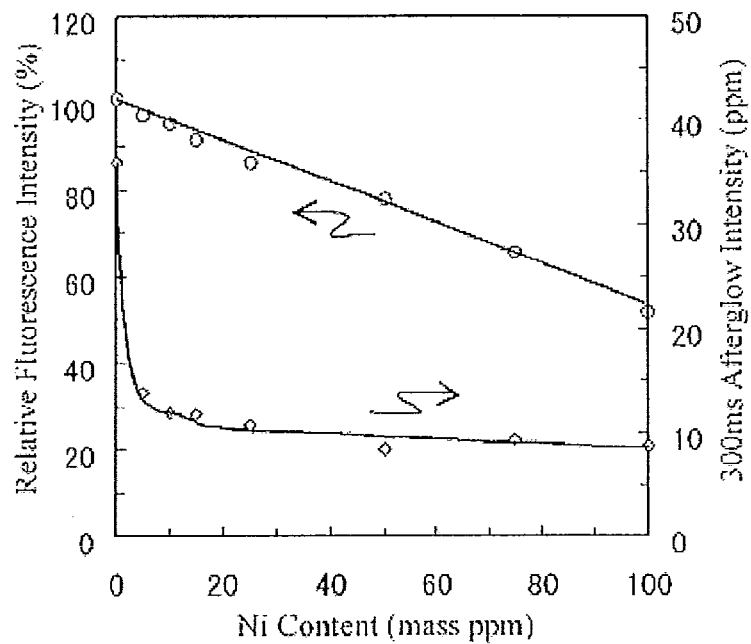
FIG. 15 is a schematic diagram showing the dependence of the relative fluorescence intensity and of the 300 ms afterglow on the content of Ni according to an embodiment of the present invention.
Figure 16:
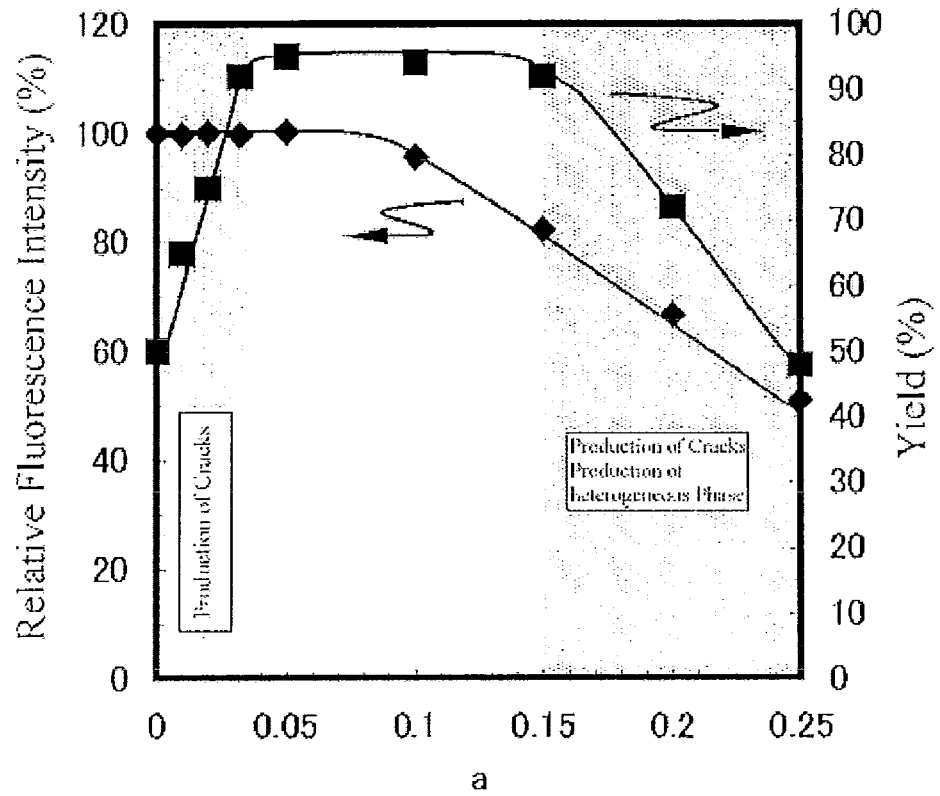
FIG. 16 is a schematic diagram showing the dependence of the relative fluorescence intensity and the manufacturing yield regarding single crystalline growth on the value a according to the second embodiment of the present invention.
Figure 17:
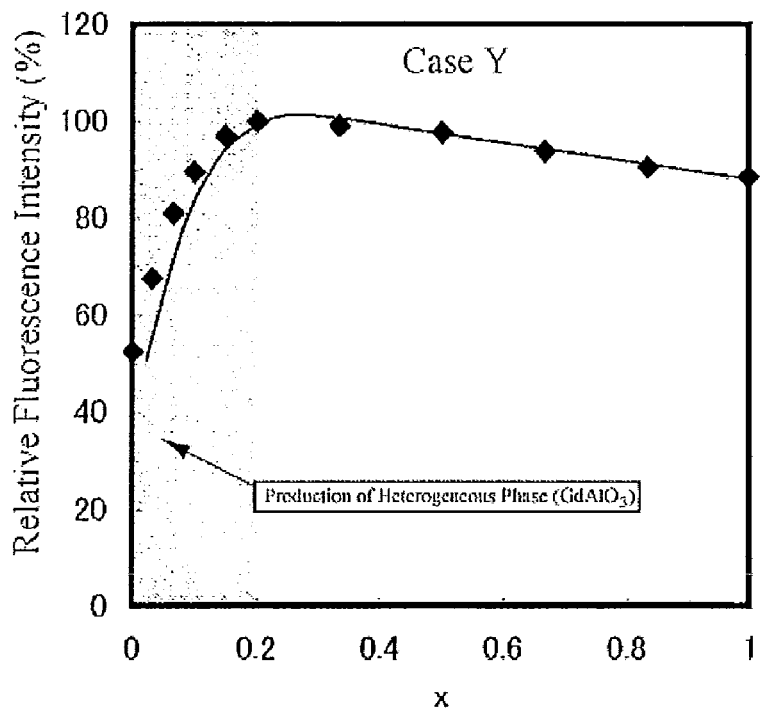
FIG. 17 is a schematic diagram showing the dependence of the fluorescence intensity on the value x regarding a fluorescence material containing Y according to the second embodiment of the present invention.
Figure 18:
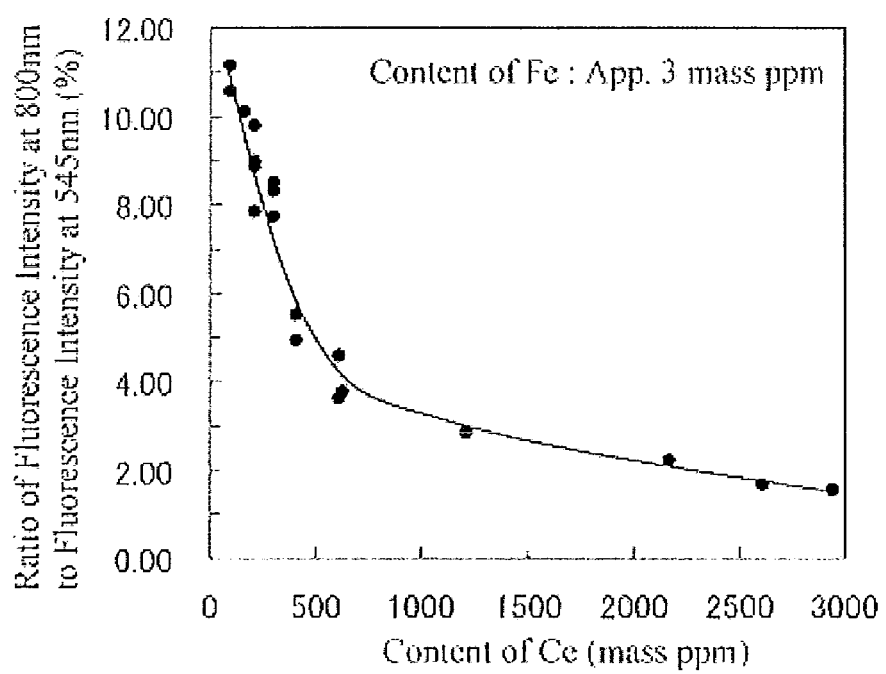
FIG. 18 is a schematic diagram showing the relationship between the content of Ce and the fluorescence intensity ratio of 800 nm to the maximum intensity of a 500 to 600 nm fluorescence spectrum regarding a fluorescent material according to the second embodiment of the present invention.
Figure 19:
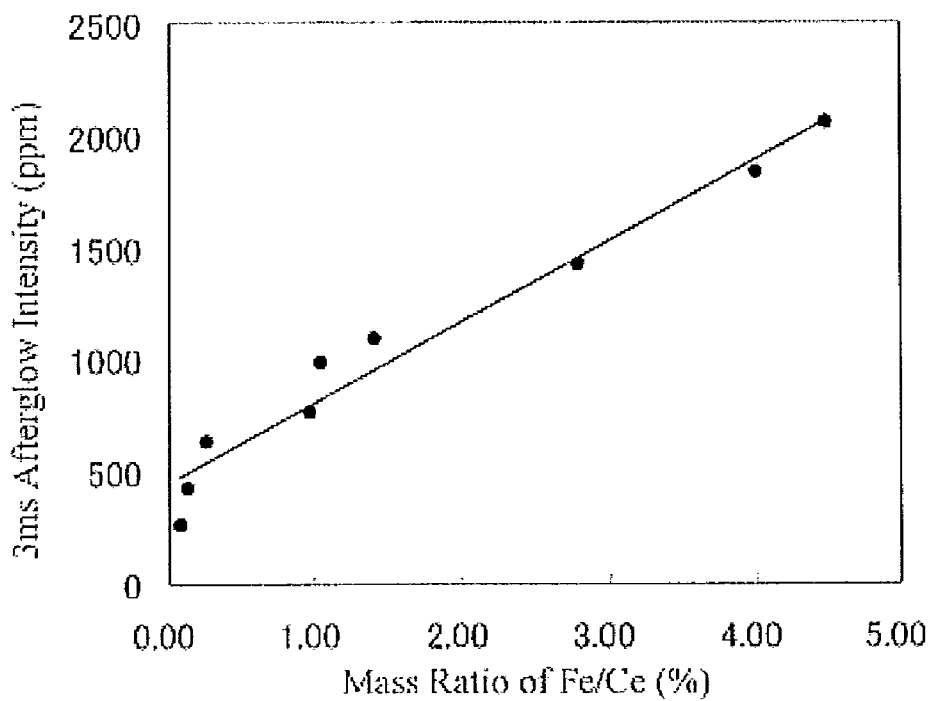
FIG. 19 is a schematic diagram showing the relationship between the mass ratio (Fe/Ce) of the content of Fe to the content of Ce and the level of afterglow 3 ms after the termination of X-ray radiation regarding a fluorescent material according to the second embodiment of the present invention.
Figure 20:
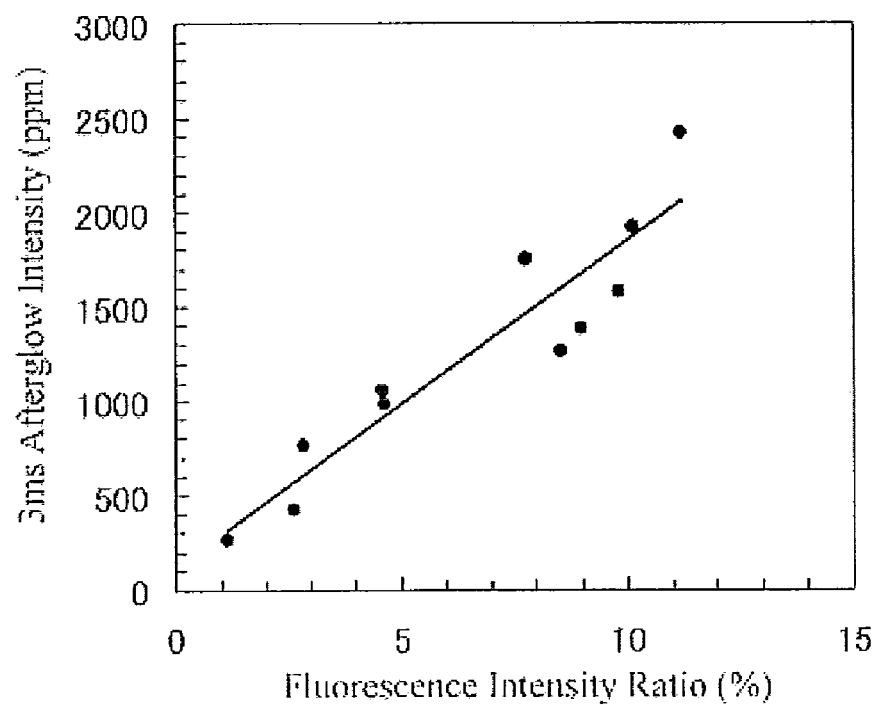
FIG. 20 is a schematic diagram showing the relationship between the ratio of the maximum fluorescence intensity in the wavelength range of 700 to 850 nm n to the maximum fluorescence intensity in the wavelength range of 500 to 600 nm and the level of afterglow 3 ms after the termination of X-ray radiation regarding a single crystalline fluorescent material according to the second embodiment of the present invention.
Figure 21:
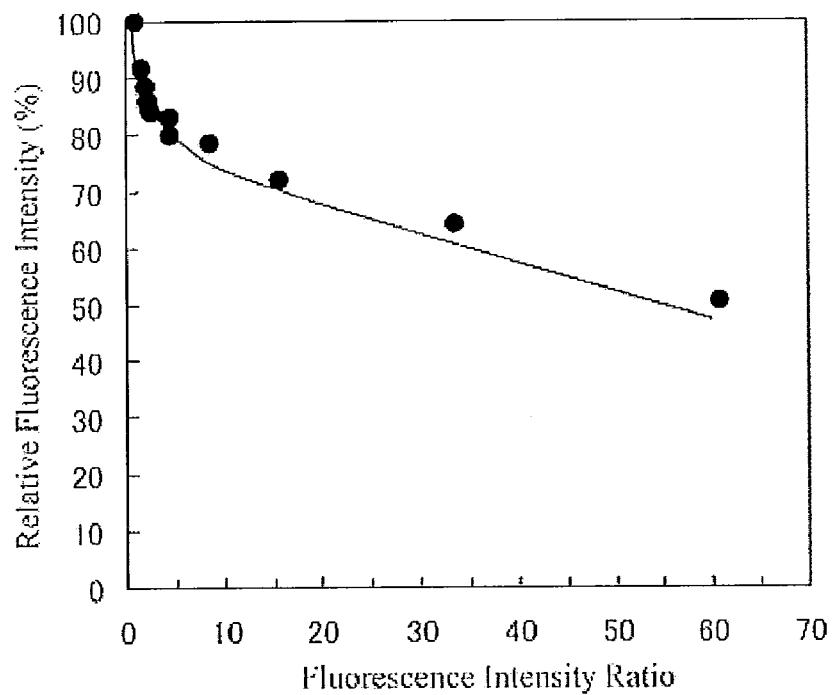
FIG. 21 is a schematic diagram showing the relationship between the ratio of the maximum fluorescence intensity at a wavelength of 380 nm to the maximum fluorescence intensity in the wavelength range of 500 to 600 nm and the relative fluorescence intensity during the emission of X-rays regarding a polycrystalline fluorescent material according to the second embodiment of the present invention.
Figure 22:
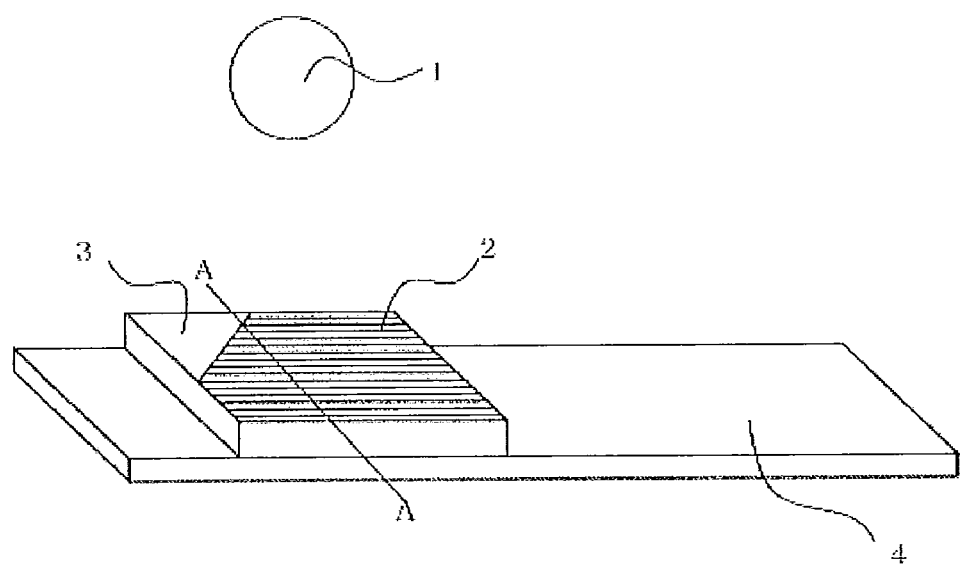
FIG. 22 is a schematic perspective view of a radiation detector according to the third embodiment of the present invention.
Figure 23:
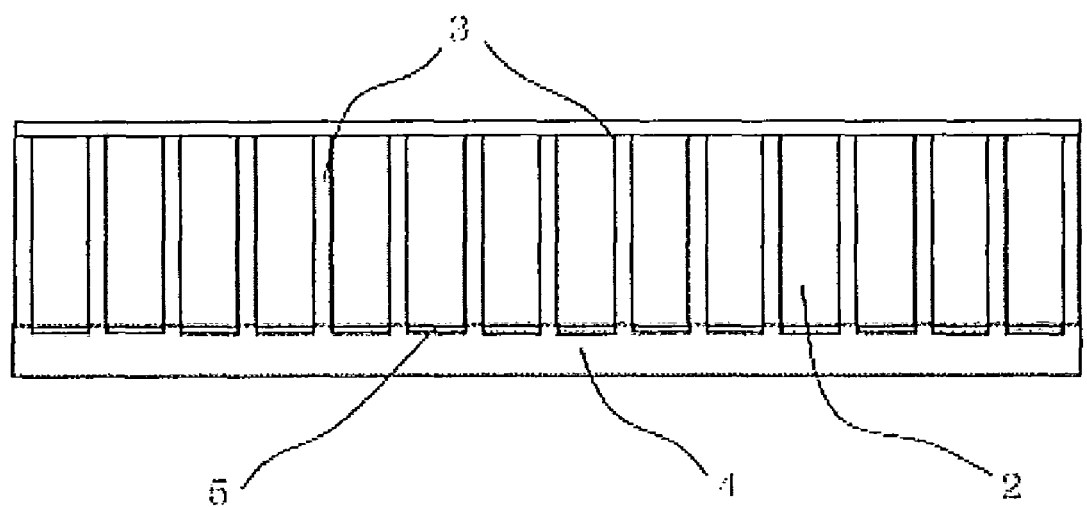
FIG. 23 is a sectional view taken along line A-A in FIG. 22.

| List of Reference Numbers | |
|---|---|
| 1: | X-ray source |
| 2: | scintillator |
| 3: | light reflection film |
| 4: | wiring substrate |
| 5: | silicon photodiode |

The invention claimed is:

1. A fluorescent material comprising:
Ce, the Ce acting as an activator;
at least Gd, Al, Ga, O, Fe, and
a component M; wherein the component M is at least one of Mg, Ti, Ni;
wherein the composition of the material is expressed by the general formula:

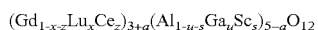

$(Gd_{1-x-z}Lu_xCe_z)_{3+a}(Al_{1-u-s}Ga_uSc_s)_{5-a}O_{12}$ wherein
$0 \leq a \leq 0.15$,
$0 \leq x \leq 0.5$,
$0.0003 \leq z \leq 0.0167$,
$0.2 \leq u \leq 0.6$, and
$0 \leq s \leq 0.1$; and wherein, regarding the concentrations of Fe and the component M,
0.05≦Fe concentration (mass ppm)≦1, and
0≦M concentration (mass ppm)≦50.

2. The fluorescent material according to claim 1, wherein, for the value a, 0.005≦a≦0.05.

3. The fluorescent material according to claim 1, wherein, for the value x, 0.03≦x≦0.2.

4. The fluorescent material according to claim 1, wherein, for the value z, 0.001≦z≦0.005.

5. The fluorescent material according to claim 1, wherein, for the value u, 0.35≦u≦0.55.

6. The fluorescent material according to claim 1, wherein, for the value s, 0.01≦s≦0.1.

7. The fluorescent material according to claim 1, wherein 0.05≦Fe concentration (mass ppm) ≦0.4.

8. The fluorescent material according to claim 1, wherein 3≦M concentration (mass ppm) ≦15.

9. The fluorescent material according to claim 1, wherein the fluorescent material is polycrystal.

10. A fluorescent material for a scintillator having a garnet structure, the material comprising:
Ce, Gd, Ga, Al, O, Fe, and a component M; wherein Ce acts as an activator;
wherein:
24.3≦Gd concentration (mass %)≦57.6,
0≦Lu concentration (mass %)≦31.1,
0.02.ltoreq.Ce concentration (mass %).ltoreq.0.7,
4.0≦Al concentration (mass %)≦12.8,
7.5≦Ga concentration (mass %)≦22.6,
0≦Sc concentration (mass %)≦2.64,
19.6≦O concentration (mass %)≦22.8,
0.05≦Fe concentration (mass ppm)≦1, and
0≦M concentration (mass ppm)≦50;
wherein the component M is at least one of Mg, Ti, and Ni; and wherein the sum of all the elements is set at 100 mass %.

11. A fluorescent material for a scintillator having a garnet structure, the material comprising:
Ce, Gd, Ga, Al, O, Fe, and a component M; wherein Ce acts as an activator,
wherein:
45.9≦Gd concentration (mass %)≦52.8,
1.7≦Lu concentration (mass %)≦12.0,
0.06≦Ce concentration (mass %)≦0.24,
7.0≦Al concentration (mass %)≦10.0,
13.7≦Ga concentration (mass %)≦20.6,
0.05≦Sc concentration (mass %)≦0.5,
20.75≦O concentration (mass %)≦21.9,
0.05≦Fe concentration (mass ppm)≦0.4, and
3.1≦M concentration (mass ppm)≦15;
wherein the component M is at least one of Mg, Ti, and Ni, and wherein the sum of all the elements is set at 100 mass %.

12. A fluorescent material comprising:
Ce, the Ce acting as an activator;
at least Gd, Al, Ga, O, Fe, and
a component Lu and/or Y;
wherein the fluorescent material contains not more than 3 weight % of Fe of the content of Ce in a fluorescent material having a garnet structure expressed by the general formula:

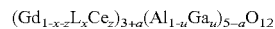

$(Gd_{1-x-z}L_xCe_z)_{3+a}(Al_{1-u}Ga_u)_{5-a}O_{12}$ wherein L is Lu and/or Y,
0≦a≦0.15,
0≦x≦1.0,
0.0003≦z≦0.0167,
(x +z ≦1.0), and
0.2≦u≦0.6.

13. The fluorescent material according to claim 12, wherein, regarding a fluorescence spectrum obtained when the fluorescent material is excited by a excitation light having a wavelength of 260 nm, the ratio of the maximum fluorescence intensity in the wavelength range of 700 to 850 nm to the maximum fluorescence intensity in the wavelength range of 500 to 600 nm is not greater than 8%.

14. The fluorescent material according to claim 13, wherein, regarding the fluorescence spectrum, the ratio of the maximum fluorescence intensity in the wavelength range of 300 to 450 nm to the maximum fluorescence intensity in the wavelength range of 500 to 600nm is not greater than 7%.

15. The fluorescent material according to claim 12, wherein the fluorescent material is polycrystal.

16. A scintillator made of a fluorescent material according to any of claims 1, 10, 11, 12, 9, or 15.

17. The scintillator according to claim 16, wherein the scintillator has a thickness of 0.5 to 5 mm.

18. A radiation detector comprising:
a scintillator according to claim 16; and
a light receiving element, the element designed to detect fluorescent light emitted from the scintillator.

* * * * *